United States Patent [19]
McIntosh

[11] Patent Number: 4,959,797
[45] Date of Patent: Sep. 25, 1990

[54] SYSTEM FOR TIGHTENING THREADED FASTENER ASSEMBLIES

[75] Inventor: James L. McIntosh, Westminster, Colo.

[73] Assignee: Tensor Development, Inc., Westminster, Colo.

[21] Appl. No.: 169,974

[22] Filed: Mar. 18, 1988

Related U.S. Application Data

[63] Continuation-in-part of Ser. No. 805,719, Dec. 6, 1985, abandoned, and a continuation-in-part of Ser. No. 131,991, Dec. 11, 1987, Pat. No. 4,891,764.

[51] Int. Cl.⁵ ............... G05D 13/02; G05D 17/02; G05F 1/10
[52] U.S. Cl. ................ 364/508; 318/432; 318/594; 364/571.04; 364/571.08
[58] Field of Search .......... 364/506, 508, 550, 551.01; 29/407; 318/600, 689, 696

[56] References Cited

U.S. PATENT DOCUMENTS

| | | | |
|---|---|---|---|
| Re. 31,569 | 5/1984 | Eshghy | 29/407 |
| 4,182,979 | 1/1980 | Douglas et al. | 318/689 |
| 4,344,216 | 8/1982 | Finkelston | 29/407 |
| 4,374,351 | 2/1983 | Fishman et al. | 318/600 |
| 4,375,120 | 3/1983 | Sigmund | 29/407 |
| 4,375,121 | 3/1983 | Sigmund | 29/407 |
| 4,375,122 | 3/1983 | Sigmund | 29/407 |
| 4,400,785 | 8/1983 | Wallace et al. | 364/508 |
| 4,625,291 | 11/1986 | Hormann | 364/550 |
| 4,685,050 | 8/1987 | Polzer et al. | 364/508 |
| 4,692,674 | 9/1987 | Packard et al. | 318/696 |

Primary Examiner—Felix D. Gruber
Attorney, Agent, or Firm—Sheridan, Ross & McIntosh

[57] ABSTRACT

A threaded fastener assembly tool is affixed to the output shaft of a DC motor, the torque of which is controlled by the current through the windings. An angular position encoder is attached to the shaft. A microprocessor monitors the angular position of the shaft as a function of time and controls a programmable current source which provides current to the windings of the motor. The processor varies the amount of torque applied to the fastener tool as a function of various parameters to control the installation of the fastener and detect defective fastener units.

39 Claims, 11 Drawing Sheets

SYSTEM FOR TIGHTENING THREADED FASTENER ASSEMBLIES

BACKGROUND OF THE INVENTION

The present application is a Continuation-in-Part of U.S. Pat. Application Ser. No. 805,719, filed Dec. 6, 1985 now abandoned and U.S. Pat. Application Ser. No. 131,991, filed Dec. 11, 1987 and now U.S. Pat. No. 4,891,764.

FIELD OF THE INVENTION

The invention relates to threaded fastener assemblies and, more particularly, to an improved system for applying and monitoring controlled levels of torque to a threaded fastener for reliably forming an assembly.

HISTORY OF THE PRIOR ART

The clamping load which secures the parts in a threaded fastener assembly is very important in determining whether or not the parts assembly will perform reliably in service. As a result, threaded fasteners should be installed onto their assemblies in a precise and controlled manner, whereby a preselected clamping load sufficient to maintain the integrity and reliability of the fastener assembly is maintained.

Prior art techniques for the installation of threaded fasteners onto fastener assemblies have included controlling the tightening of the fasteners through the use of torque sensitive means. Such systems have generally included two steps in their assembly operation, a first step of which is that the fastener is run onto its threaded receiving member with a high level of acceleration limited by controlling the current through the motor. As the fastener reaches a preload condition and the velocity begins slowing down, the torque is increased to a much higher, preselected value until it reaches a preset value of torque measured by a transducer, at which point the operation is terminated. Other more sophisticated improvements on this basic procedure have been proposed. For example, in U.S. Pat. No. 4,104,780 to Sigmund and U.S. Pat. No. 4,104,778 to Bliet the disclosed technique includes imparting a selected degree rotation to the fasteners after a starting point has been determined by detecting that the rate of change of torque applied to the fastener with respect to rotation has become constant. In U.S. Pat. No. 3,982,419 there is taught a system for tightening threaded fasteners into the yield region of the fasteners themselves. Finally, in U.S. Pat. No. 4,344,216 to Finkelston and 4,375,122 to Sigmund there are taught relatively complex systems for calculating theoretical instantaneous gradients of the tightening region of a torquerotation curve and using these calculations as part of a comparison decision on the level of torque to be applied to the fastener.

In all of these prior art systems there still remains the basic possibility that the system is unable to detect cross-threaded fastener assemblies, or defective threads in the fastener or defective fasteners themselves. Such anomalies can artificially create a high level or a low level of torque as the fasteners are being tightened, which level may fall within the criteria necessary for terminating the tightening operation when the fastener assembly was not within the desired envelope of torque v. revolutions (spring rate).

The system of the present invention includes a technique wherein the fastener velocity, acceleration and applied torque are constantly monitored, controlled, and recorded, throughout five discrete regions of the fastening operation. The monitored data are analyzed in real time to allow such parameters as the actual fastener effective torque and the threaded bolt effective spring rate to be used both to control the fastening operation and to provide a comparison with an envelope of fastener allowable tolerances, nonconformance with which will cause the fastening operation to be terminated and flagged as an out-of-tolerance assembly. The system operates quickly enough to allow the fastening operation involving defective fastener parts to be terminated prior to the onset of any additional damage to the fastener or to the assembly itself. Identifiable records of each fastener assembly operation can be preserved for use in any post-service analysis.

SUMMARY OF THE INVENTION

The system of the present invention includes a technique whereby a threaded fastener assembly tightening operation is divided into five discrete phases: a starting phase, a runon phase, a run on end phase, a tightening phase, and an end phase.

During the starting phase, the mass of the fastener nut and the fastener nut holding rotating assembly, as well as the rotational resistance caused by the friction of the threads during run-on are separately measured. These parameters are stored in a microprocessor and used to determine the actual effective torque applied to the fastener. The system also checks the effective torque against pre-stored torque limits (both minimum and maximum) which are then used to determine if the fastener is cross threaded, has damaged threads, improper bolt size, improper thread pitch, or other anomalies indicated by the thread frictional resistance.

Once the startup phase is ended, the system enters a run-on phase wherein the system sets a constant torque on the fastener, as determined by the previously measured parameters, and monitors the fastener acceleration both to determine if an out-of-tolerance condition (i.e. deformed or damaged threads) or the end of the run-on phase has occurred. If a change in velocity indicates the run-on phase may have ended, a special subroutine is then called to determine whether or not the run-on stage has been completed, and at what point the tightening stage is to start. These data are used to zero a distance counter from which the precise amount of fastener angular distance turned can be determined at each point in the tightening phase. As in the startup phase, the system also checks to see that the fastener resistance torque is within the pre-stored limits which indicate the end of the run-on phase. If an out-of-tolerance condition occurs, the fastener is flagged as defective and does not continue on into the fourth phase for tightening the fastener.

During the tightening phase a series of rotational distance increments are recalled from memory. For each of these increments, which can vary in size as a function of the fastener angular distance remaining to be tightened, a constant velocity step is maintained, followed by a rapid deceleration to a lower oonstant velocity step. During each step of constant velocity motion, and during each step of deceleration, a maximum and minimum effective torque value is first calculated from the fastener's measured performance, and then checked against a pre-stored envelope of torque value limits, to determine that proper fastener integrity has been maintained The fastener torque-deflection ratio (spring rate) is also calculated and checked against limits. If an out-of-tolerance condition occurs, the system is flagged as defective. The maximum and minimum torque comparison values are progressively increased for each distance as the fastener is tightened. The deceleration step values are set such that the velocity at the end of the preset total distance turned is a low value.

The final tightening of the fastener occurs during the end phase, wherein the final torque imparted to the fastener in the tightening phase is increased to a pre-set final specified value. This is accomplished by setting a low but constant rotational velocity to the fastener while monitoring the torque required to maintain this velocity. When the applied torque becomes equal to the pre-set specified value, the tightening operation is complete. During each of many time intervals during this end phase tightening process, the fastener mechanical spring constant is calculated and compared with the pre-stored envelope of fastener spring constant limits, to assure that the fastener mechanical integrity, as installed, has not been degraded. In addition to the fastener spring constant integrity test, the total rotational distance travelled by the fastener is also measured, and if in excess of a pre-set limit will flag the assembly as defective.

The operation of the five phase tightening process is achieved as follows:

The system of the present invention includes a method for controlling the torque applied to a threaded fastener wherein the torque is not measured, but is precisely set by a programmable regulated current source and only the displacement of the shaft rotating the fastener is measured as a function of time. The acceleration and deceleration which occurs as a result of the differences in the forces driving or opposing the motor rotating the fastener is calculated and stored in a microprocessor. This acceleration and deceleration is used to determine the unknown forces opposing the rotation of the shaft tightening the fastener. Angular rotation per unit of time is used to calculate the values of velocity and acceleration and, thus, the control parameters needed to set the current values to the motor necessary to accomplish the fastener tightening operations.

The setting of the current to the motor driving the shaft rotating the fastener by a programmable regulated current source totally eliminates the need for measuring a low level analog force by means of a torque transducer. In addition it provides an accurate means for determining the forces opposing the turning of the fastener at all time prior to completion of the operation.

In a further aspect of the invention, the torque rotating the fastener is set and not measured and thus the inherent delay between measuring the torque, deciding if it is correct, and shutting down the system in the case of an anomaly is virtually eliminated. This allows enormously faster response time to an anomaly in the fastener tightening operation than in prior art systems. A process control computer is used to accomplish setting of the torque and the measuring of velocity and acceleration of the shaft rotating the fastener. This microprocessor monitors and stores displacement pulses from an incremental shaft encoder and by comparison of changes in displacement to clock pulses, the system establishes a velocity for the rotation of the fastener. Velocity is periodically calculated and stored in a register and each subsequent velocity determination is subtracted from an initial value to determine acceleration, as velocity changes as a function of time.

BRIEF DESCRIPTION OF THE DRAWINGS

For a more complete understanding of the present invention and for further objects and advantages thereof, reference may now be had to the following detailed description taken in conjunction with the accompanying drawings in which.

DETAILED DESCRIPTION OF THE PREFERRED EMBODIMENT

Figure 1:
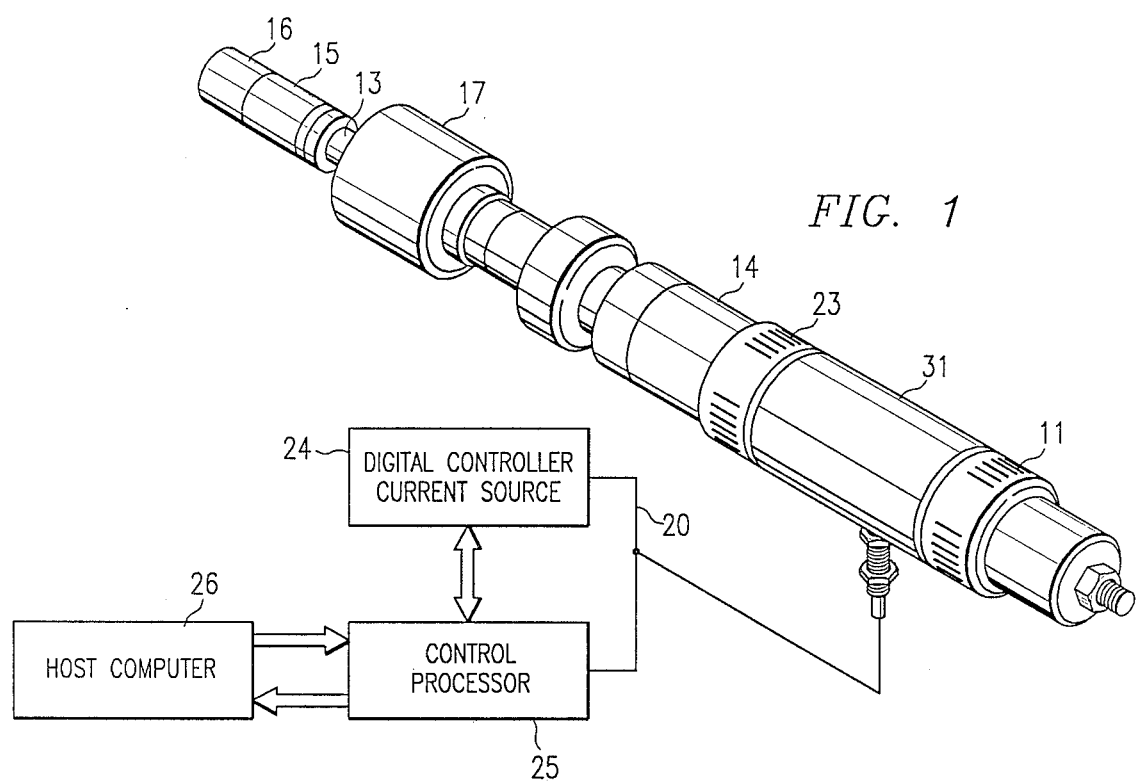
FIG. 1 is a perspective illustration of a system for tightening threaded fastener assemblies is accordance with the teaching of the present invention.

Referring first to FIG 1 there is shown a combined perspective and block diagram of a system for the tightening of threaded fastener assemblies constructed in accordance with the teachings of the present invention. The system includes a driving means for holding and rotating a fastener and applying torque thereto to tighten an assembly held together by a fastener and a fastener receiving member. The driving member or a tool 11 having an electric motor 31, the operation of which is controlled by current received from a digitally controlled current source 24. The output of the electric motor 31 drives an output shaft 13 through a gear box 14 so that, if desired, the output shaft does not rotate at the same high speed as the electric motor 31. The output shaft 13 of the tool carries an adapter 15 for connection with a socket or other driving tool 16 for receiving the fastener,. The shaft 13 is mounted in bearing assembly 17. The output shaft 32 of the motor assembly itself as such attached to the drive shaft 13 is shown in more detail in FIG. 2.

Figure 2:
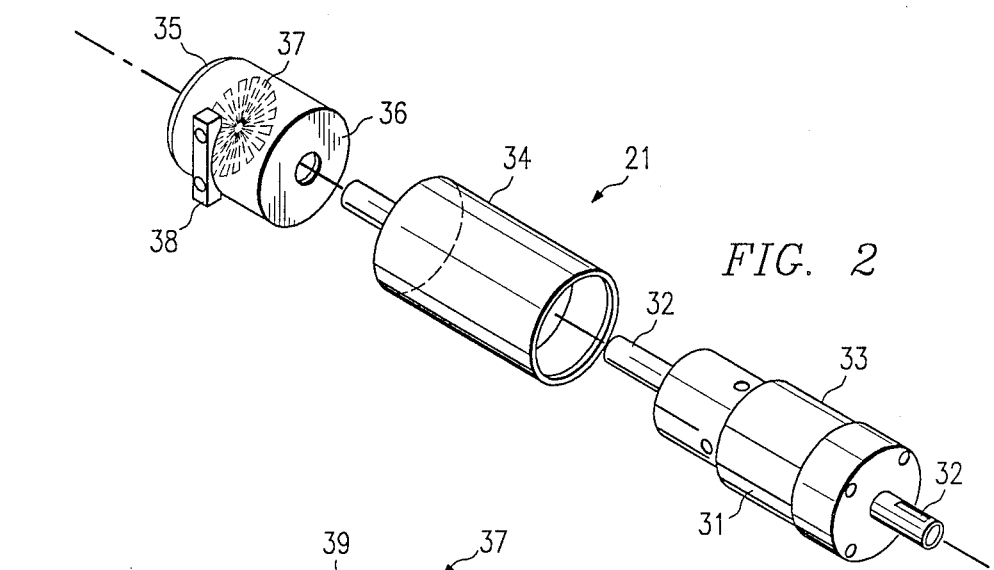
FIG. 2 is an exploded perspective view of a motor and angular position encoder assembly used in the system of FIG. 1.

Referring to both FIGS. 1 and 2, the motor 31 is connected to an angular position encoder assembly 23, the output of which couples signals to a control processor 25 to indicate every incremental change in the angular position of the output shaft of the motor. The control processor is connected via bus assembly to a digital controller current source 24. The output of the current source applies operating current to the windings of the motor 31 via the cable 20. The control processor 25 is interconnected with a host computer 26 for the interchange of programming information as well as the storage of bulk information used during the operation of the control processor 25.

The system of FIG. 1 is composed of the DC electric motor 31 the output shaft of which 32 is connected to the rotary angular position encoder assembly 23 as well as to the driveshaft 13 of the adaptor 15 for receiving a socket 16 sized for engaging the fastener to be threaded onto the assembly. The output of the rotary position encoder 23 is connected to the direction decoding logic and a counter within the processor 25 for storing the incremental pulses from the angular position encoder. The value stored in the counter within the control processor 25 is, in turn, connected to the host processor 26 for storage and processing of data. The control processor 25 is also connected to the digitally controlled current source 24, the output of which is controlled by digital signals from the control processor 25. The current source 24 is connected to a voltage source capable of either sourcing or sinking the maximum current which the current source 24 is capable of controlling.

In initial operation, as current is allowed to flow from the digital controlled current source 24 into the motor 31, a torque is generated by the motor which is proportional to the current flowing through the motor. As the current through the motor 31 is incrementally increased by the control processor 25, it incrementally increases the torque developed by the motor. Sufficient force is developed by the motor shaft 32 to overcome the forces of inertia and friction preventing driveshaft 13 for the threaded fastener from rotating and rotation of the fastener onto the receiving member begins. During the rotation of the fastener, the control processor 25 periodically and at timed intervals reads the value of the encoder counter and calculates the velocity and acceleration from this information. The control processor 25 thereafter controls the torque developed by the motor 31 to maintain a preset value of acceleration and/or a selected value of periodically calculated velocity as a function of the angular distance travelled by the fastener over time.

The torque values required to maintain the desired velocity/acceleration values are compared to prestored maximum and/or minimum values. If the torque required to rotate the fastener as a function of angular distance falls outside the prestored range of values, the control processor 25 will flag the fastener assembly as being defective and may either unthread the fastener or sound an alarm for an operator.

The torque required to move the fastener its required rotational distance may also be stored in a program and used to generate data to set the maximum-minimum force envelope indicative of a satisfactory fastener tightening operation. This information may also be used by storage in the host computer 26 to provide a history of the torque required to perform the fastener assembly operation and used to record the integrity of a fastener assembly in a high reliability environment. The current mode motor control of the DC electric motor driving the fastener enables its operation in the improved fashion.

Angular Position Encoder

Referring next to FIG. 2, there is shown an exploded perspective view of an encoder and motor assembly 21 used in conjunction with the present invention. The assembly 21 includes the encoder 23 and a permanent magnet DC motor 31 having a rotary shaft 32 extending axially through a cylindrical housing 33 within which permanent magnet field assemblies are located. The motor housing 33 is mounted within a cylindrical shell 34.

The motor assembly 21 also includes a shaft angular position encoder sub-assembly 35 including a housing 36 which axially receives the motor shaft 32 to the end of which is affixed an angular position encoder 37. The angular position encoder 35 includes a mounting flange 38 by means of which the other components of the system may be attached. One embodiment of the shaft angular displacement position encoder 37 is shown in FIG. 3.

Figure 3:
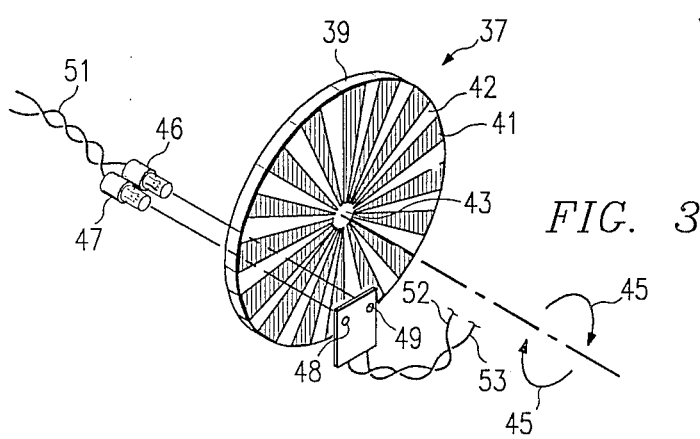
FIG. 3 is an optical position encoder shown in the motor assembly of FIG. 2.

In FIG. 3 there is shown a transparent circular disc 39 having a plurality of radially outwardly extending angularly divided opaque areas 41. Each opaque area 41 is separated by a transparent area 42 and the center 43 of the disc 39 is mounted to the end of the shaft 32 Of the motor 31. The motor shaft and disc 39 can rotate in either clockwise or counterclockwise directions as is represented by arrows 45. A pair of light sources 46 and 47 are positioned on one side of the disc 39 while a pair of photocells 48 and 49 are mounted in aligned positions on the opposite side of the disc 39. The light sources 46 and 47 are energized via wires 5 so that light passes through the transparent areas 42 and is blocked by the opaque areas 41. As the disc 39 is rotated, pulses are generated by the light sensors 48 and 49 over their respective leads 52 and 53 leading to the control system within the control processor 25. These pulses are stored in an electronic counter which is part of the control processor 25 which allows it to tell how far and how fast the motor shaft rotating the disc 39 has moved. One of the light sensors 48 is slightly ahead of the other light sensor 49 so that the rotation of the disc 39 in one direction produces a different pulse pattern than rotation of the shaft mounting the disc 39 in the other direction. The lines on the optical encoder disc 39 are preferably formed at 0.1° of arc from one another to provide a very high degree of resolution of the angular position of the shaft 32 of the motor 31. In other embodiments, the angular position encoder for the motor shaft may include other types of angular position sensing means such as Hall Effect devices which sense the movement of a magnetized area and provide similar angular position displacement encoding for the output motor shaft 32 of the motor 31.

Processor Control

Figure 4:
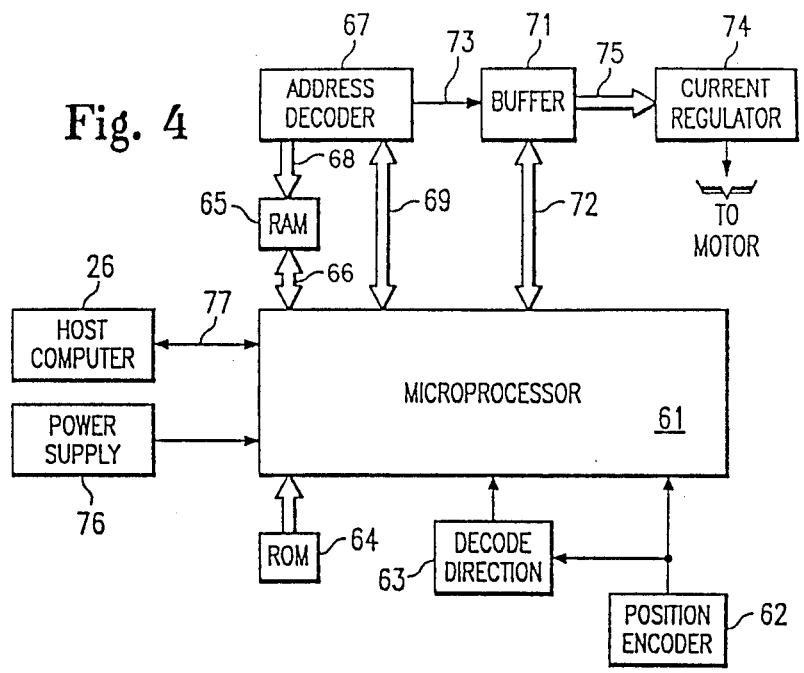
FIG. 4 is a block diagram of the microprocessor controlled elements of one embodiment of the system of the present invention.

Referring next to FIG. 4, there is shown a block diagram of the microprocessor controlled elements of one embodiment of the system of the force determining and control system of the present invention which includes a microprocessor 61 which can comprise any one of a larger number of digital processing devices now available. In one embodiment of the system of the present invention a Model Super Z8 Processor manufactured by Zilog was used to substantial advantage. Such a processor may include some of the other elements shown as separate components of the block diagram in FIG. 4, however, these elements may be included as separate components if other processing devices are used to implement the system of the present invention. The microprocessor 61 is connected to receive angular position displacement information from a position encoder data unit 62 and angular direction data from a unit 63. A read-only memory (ROM) 64 provides preprogrammed control data for the microprocessor 61. Similarly, random access memory (RAM) 65 is available to the microprocessor 61 through bus 66 to both store and recall processing information. An address decoder 67 is connected to the RAM 65 through a bus 68 and to the microprocessor 61 through a bus 69. A buffer memory register 71 is connected to the processor 61 through a bus 72 and to the address decoder via date line 73. The contents of the buffer 71 are communicated to the digitally controlled current regulator 74 via a bus 75. The current regulator supplies precisely controlled values of current to the motor.

The microprocessor 61 is in data communication with the host computer 26 via a communication port which may include a conventional communication module such as an RS-232 interface. The power supply 76 is shown to provide separate power for the RS-232 interface included as part of the microprocessor 61 when the Super Z8 is employed or a similar implementation is used.

In general, the microprocessor 61 is in constant communication with the host computer 26 via the RS-232 interface 77 to receive program instructions as well as provide a data storage backup and operator communications link. Data stored in the RAM memory 64 sequences the processor 61, as will be further discussed below, to receive position encoder data from unit 62 and decoder direction data from unit 63, and to perform calculations thereon in order to determine the displacement, velocity, and acceleration of the motor output shaft at periodic intervals. The processor 61 also selects either in accordance with preprogrammed instructions or in accordance with its calculations based upon the position encoder and time data a digital number and supplies it through the buffer 71 and the bus 75 to the digitally controlled current regulator 74. This digital number defines a precise value of current which will be supplied by the current regulator 74 to the windings of the motor and thus establish a precise preselected value of torque to be placed on the output shaft of the motor.

By first setting the value of the current to be supplied to the motor by the current regulator 74 and therefore the torque produced, and then calculating the value of acceleration produced in the output shaft of the motor based upon data from the angular position displacement encoder unit 62, the micrOprocessor 61 is capable of determining the exact value of the force resisting the rotation of the output shaft. The concept is that of using a microprocessor to digitally set a preselected value of current to be supplied to the windings of the motor by the regulator 74 and then using the change in angular displacement of the motor shaft as a function of time to calculate the force of resistance of torque. Ideally, the position encoder should be mounted on the motor shaft as near to the motor as practical. However, in applications of the present system where there is essentially no compliance or backlash between the motor and the load, using only one encoder mounted directly adjacent to the motor does not contribute to any significant errors. The exemplary motor and encoder assembly of FIG. 2 is intended for such an application.

A specific configuration and operation of the processor control circuitry of FIG. 4 can be divided into six functional blocks including a Super Z8 microprocessor chip 61, the ROM memory 64, the RAM memory 65, a direction logic 63, displacement decoding logic 62, and multiple tristate buffer logic 71. Also included is a −5 volt generating chip to power Universal Asynchronous Receiver/Transmitter (UART) within the Super Z8 microprocessor chip 61.

At startup the ROM memory 64 stores data to bootstrap the microprocessor 61 to receive serial data through the UART (included as part of the Super Z8 microprocessor 61) from the host computer 26. These data are input via a direct memory access function on the microprocessor to the RAM memory 65 connected to the microprocessor 61. The shaft direction decoding circuitry 63 sets a counter (also on board the Super Z8 microprocessor 61), to count up or down, depending upon the direction determined by the direction decoding logic 63. The counter accumulates pulses from the displacement decoding logic 62 and values in the counter are periodically read by the microprocessor 61 and stored in its stack registers or memory. The address decoding logic 67 actuates a selected tristate buffer which is connected to the programmable current source 74. At selected times the microprocessor 61 may be polled through the UART to send data to and from the host processor 26. The angular position data is read from the encoder counter 62 and the current data is read to the current regulator 74 to control the torque of the motor.

Figure 5:
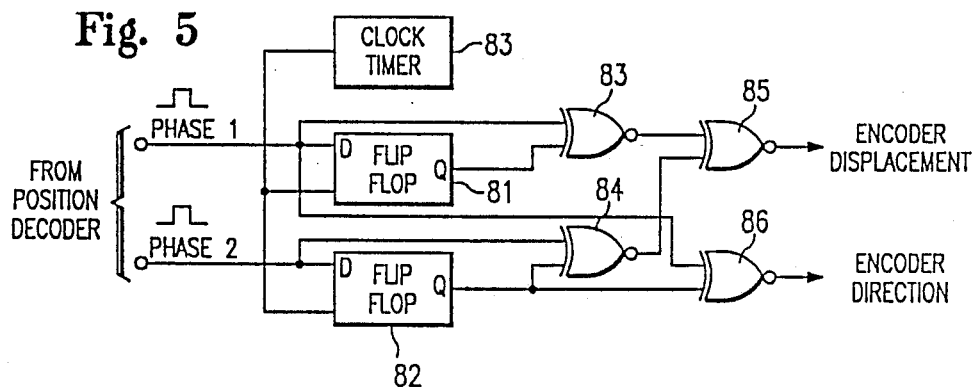
FIG. 5 is a schematic diagram of angular position displacement and direction decoder logic shown in FIG. 4.

Referring now to FIG. 5, there is shown a block diagram of circuitry which may be employed to decode the pulse data as to the direction and angular position of the position encoder. The circuit decodes the angular direction and angular displacement of the motor shaft from the angular position encoder pulses and utilizes that information to cause a counter within the microprocessor 61 to count up or count down for each displacement bit depending upon the state of the direction bit in the decoding logic. A pair of flipflops 81 and 82 each have one input connected to the output of a clock timer 83. The clock timer may comprise a conventional LM-555 timer while each of the flip-flops 81 and 82 may comprise one half of a 74174 flip-flop. The D inputs of each of the flip-flops 81 and 82 are connected, respectively, to the leads designated 52 and 53 leading from the photocells 48 and 49 of FIG. 3. Thus the input flip-flop 81 is connected to a phase 1 signal comprising a first train of square wave pulses from the position encoder while the other flip-flop 82 is connected to a second train of square wave pulses, phase 2. The phase 1 pulses are shifted 90° in time from the phase 2 pulses.

The Q output of flip-flop 81 is connected to one input of an exclusive NOR gate 83 while the other input thereto is connected from the phase 1 signal. The Q output from the flip-flop 82 is connected to one input of a second exclusive NOR gate 84, the other input of which is connected to the phase 2 input signal. One input of a third exclusive NOR gate 85 is connected from the output of gate 83, while the other input is connected from the output of gate 84. One input of a fourth exclusive NOR gate 86 is connected from the Q output of flip-flop 82, while the other input is connected from the phase 1 input from the position encoder. As can be seen from the circuit diagram of FIG. 5, the flip-flops 81 and 82 and the exclusive NOR gates 83–86 work in synchronism with the pulses of the clock timer 83 and the phase 1 and phase 2 input to decode the encoder direction and encoder displacement. The phase and phase 2 input signals are 90° out of phase with each other and, thus, when one is high and one is low, one of the phases triggers its associated flip-flop into the set state which is communicated through the associated exclusive NOR gates connected to it. Thus the output of the exclusive NOR gate 86 is either high or low depending upon the angular direction of the encoder. The output of the exclusive NOR 85 displays a one state only when both phase and phase 2 are high. This gives a periodic pulse out to the microprocessor 61 which allows it to determine the total angular distance of displacement in four increments. Thus, the angular (quadrature decoding) distance of displacement is measured because both exclusive NOR gates 85 and 86 will only be high at the same time every so often. And this period depends upon the resolution of the encoder. For example, in the event that a thousand count resolution is used this would happen every 1/1000 of 360° of arc. Similarly, the output of exclusive NOR gate 86 is provided as a function of the phase difference between the two phase 1 and phase 2 signals and thus provides to the microprocessor 61 an indication of the direction in which the encoder is rotating and, thus, the direction of the angular displacement of the motor shaft.

The quadrature decoding logic described above may also be implemented by a integrated circuit such as the IXSE 501 manufactured by the IXYS Corporation.

Motor Driver Circuit

Figure 6:
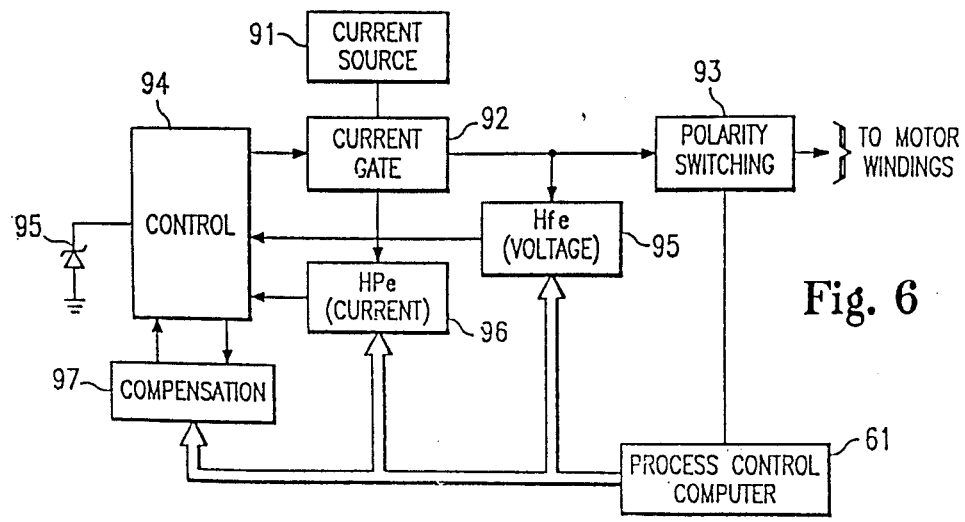
FIG. 6 is a block diagram of a programmable current regulated motor driver circuit used in the system of the present invention.

Referring next to FIG. 6, there is shown a block diagram of one embodiment of a configuration for effecting a stable current supply for driving a motor in current mode control in accordance with the invention. A source of electric current 91 is connected to supply current through a pass device 92 which couples the current through a polarity switching circuit 93 to the windings of the motor. The polarity switching circuit 93 changes the direction of the current flow through the motor in response to commands from the process control computer 61. The pass device 92 may take a number of different forms including a current gate such as a power switching transistor in a switch mode, or it might include circuitry which would modify the current from the source in some way such as amplifying or degrading it in some fashion. The current gate 92 form of pass device shown operates in response to a control circuit 94 which is connected to a reference voltage 90. The feedback elements of the current control system are divided into three parts: a proportional voltage feedback circuit $H_{fe}$ (voltage) 95; a proportional current feedback $H_{fe}$ (current) 96, and a gain and phase compensation circuit 97. Each of these feedback elements 95–97 operate under control of the process control computer 61 and provide signals to the control circuitry 94 to operate the current gate 92. The proportional voltage control 95 varies the division of the voltage output level, under control of the process control computer 61, and feeds back a selected proportion of the output voltage to the control circuit 94. The proportional current control 96 similarly provides a signal indicative of proportional division of current coming through the current gate 92 back to the control circuit 94, also under control of the process control computer The voltage feedback loop and current control loop of FIG. 6 is the only analog feedback employed in the system of the present invention and their uses are limited to within the confines of the motor drive circuit itself. That is, there is no analog feedback control used in the same sense it is employed in traditional servo-mechanism control systems.

In all feedback regulators compensation of the gain and phase of the feedback signal is required in order to maintain the stability of the regulator. In particular, there is usually employed a fixed value of compensation comprising a capacitor and or resistors in some manner affixed to the operational amplifier that amplifies the error signal and which controls both the phase and gain of that signal to insure stability. However, when the feedback ratio is changed, a fixed compensation may no longer be ideal for the changed ratio and this can cause the system to become unstable during certain ranges of operation, e.g. when operating conditions vary between high current and low voltage on one hand and high voltage and low current on the other.

The circuitry of FIG. 6 allows the regulator compensation to be varied in accordance with the operating conditions. That is, rather than using fixed compensation in the feedback loop, the present circuitry employs compensation as a dependent variable so that it is optimally varied in such a manner as to maintain the stability of the system. As will be further explained below, one embodiment of the circuitry uses a bank of multiple capacitors and analog switches which are digitally controlled by the process control computer. By switching combinations of the capacitors in and out of the circuit the gain and phase compensation may be varied. The compensation can be varied upon changes in the value of the impedance seen by the regulator, due to changes in the counter EMF of the motor, as well as upon the value of the feedback. All of these potentially encounterable operating conditions are programmed into the process control computer 61 which automatically varies the compensation 97 in accordance with operating conditions. Thus, the system approaches an open loop in terms of stability compensation.

The process control computer switches into the circuit the required values of compensation which have been predetermined to create a stable operating environment based upon the values of current and voltage at any particular time. The system is also responsive to the angular velocity of the motor and the direction of the motor, to determine which bank of resistors and capacitors are used to create the optimum feedback compensation. Of course, whether or not the motor is acting as a motor or generator, i.e., an electromagnetic brake, is also an important consideration in varying the compensation for optimum performance.

FIG. 6 illustrates a current control system in which current from the source 91 is passed through the current control gate 92 and the polarity switching circuit 93 while portions of the output voltage are proportionally fed back by feedback circuit 95 to the control circuit 94, proportional amounts of the operating current are fed back by feedback circuit 96 to the operating control 94, and the compensation is varied by means of circuit 97 based upon information from the process control computer 61 to provide compensation for the operating current. Each of the feedback elements 95, 96 and 97 are all operated under the control of the process control computer 61 based upon preprogrammed parameters to optimize the operating conditions and control over the current delivered to the windings of the motor.

All of the implementations of a programmable current regulator previously described use analog comparison techniques. By converting the current sense signal into binary format, it is also possible to use digital feed back techniques to create a programmable current source.

Processor Control

Figure 7:
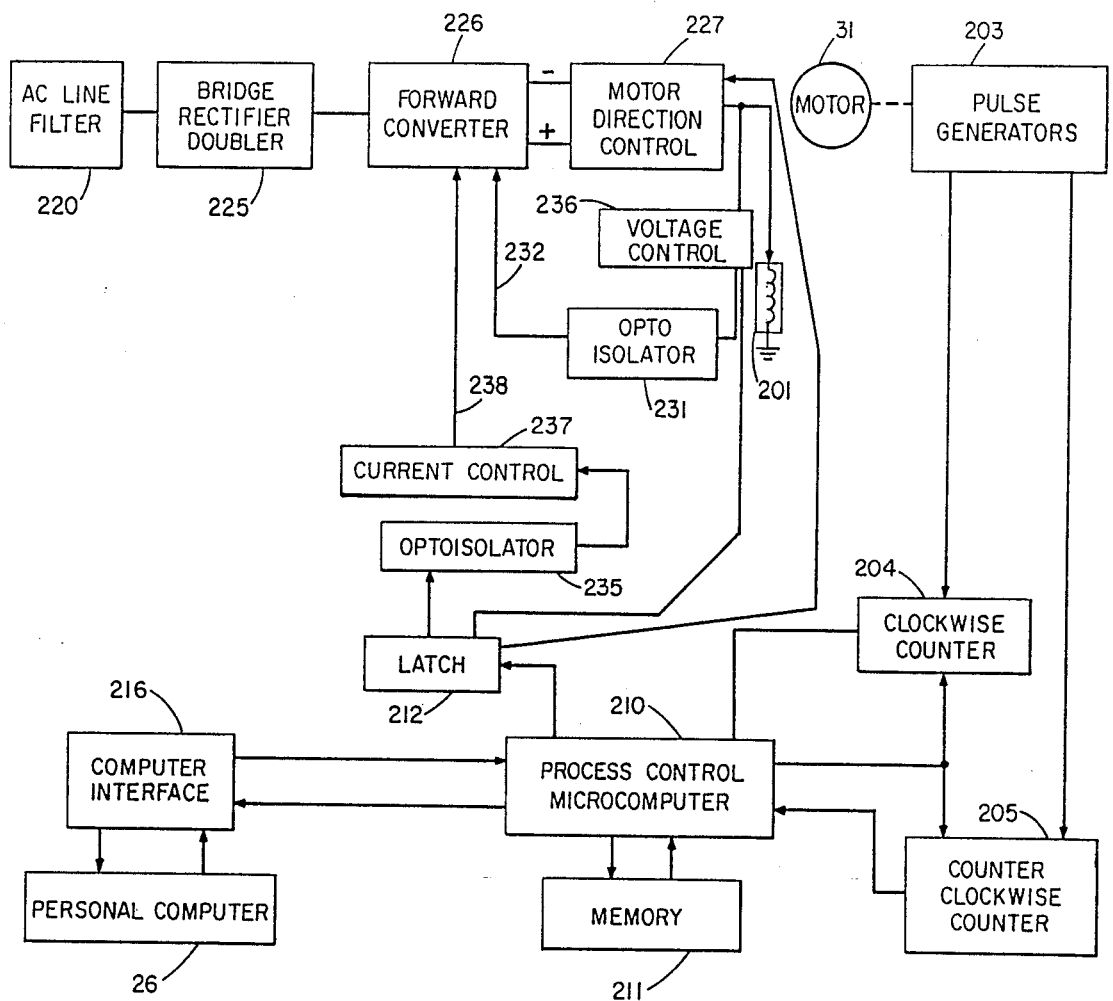
FIG. 7 is a block diagram of the microprocessor controlled elements of another embodiment of the system of the present invention.

Referring now to FIG. 7, there is shown a block diagram of the microprocessor controlled elements of another embodiment of the force determining and control system of the present invention. The permanent magnet DC control motor 31 includes a winding 201 the current flow through which controls the direction of rotation and the torque of the rotor shaft of the motor 31 and therefore the driveshaft coupled thereto. A pulse generator assembly 203 is coupled to the output of the shaft of the motor 31 and serves to generate a train of electrical output pulses as the shaft of the motor rotates In this embodiment of angular displacement distance and direction determining circuitry the output of the pulses generated by the encoder 203 is connected to a first counter 204 and a second counter 205 which together monitor the angular position and velocity of movement of the shaft of the motor 31. The counters 204 and 205 are connected to each other and to a process control microcomputer 210 which may comprise, for example, a conventional Z8 computer chip such as the model Z8 microcomputer manufactured by Zilog Corporation. The process control microcomputer 210 is also connected to a memory 211 and to latch circuitry 212.

The process control microcomputer 210 is coupled to a host personal computer 26 through a computer interface 216. The host computer 26 may be any one of the type conventionally used for general purpose computer functions. It may be conveniently of the type which is compatible with IBM PC software. The computer interface 216 is preferably of an RS 232 type interface which conventionally interconnects a Z8 microprocessor with IBM PC system compatible software.

The output of an AC line filter 220 is connected to a bridge rectifier/doubler 225 the output of which is connected to a transformer isolated current mode power supply such as a forward convertor 226. The forward convertor 226 includes both a positive and a negative Output signal to a motor direction control circuit 227. The output of the direction control circuit 227 is coupled into the motor winding 201. The output of an opto-isolator 231 is fed back through line 232 to the forward convertor 226.

The process control microcomputer 210 is connected through latches 212 the output of which is connected to an opto-isolator 235 and a voltage control circuit 236. The output of the opto-isolator 235 is coupled through a current control circuit 237 to the forward convertor 226 by means of a lead 238.

The process control microcomputer 210 is provided with data relative to the desired torque and speed of the motor 31 from the host computer 26 through the RS 232 interface 216. This information is stored in memory 211 and on command, is output by the microcomputer 210 into the latch 212. Optoisolators 235 and current control circuit 237 input to the forward convertor 226 an indication of the desired motor torque. Voltage control circuit 236 sets the maximum motor speed which can be developed and is generally set higher than the maximum speed anticipated. Motor direction information is provided to the motor direction control circuit 227 by the output of the latches 212. Actual current through motor winding 201 is set by means of the process control microcomputer 210 via the opto-isolator 231 which provides a current feedback signal over lead 232 to the forward converter 226 to prevent the current through the windings of the motor from rising above a selected value.

The process control microcomputer 210 receives input from the counters 204 and 205 and based upon the process control software which is also stored in the memory 211. The microcomputer 210 constantly varies the information provided to the latch 212 to provide continuous control over the direction, speed, and torque of the motor as a function of position of the motor shaft as well as the resistance of the load.

Motor Driver Circuit

Figure 8:
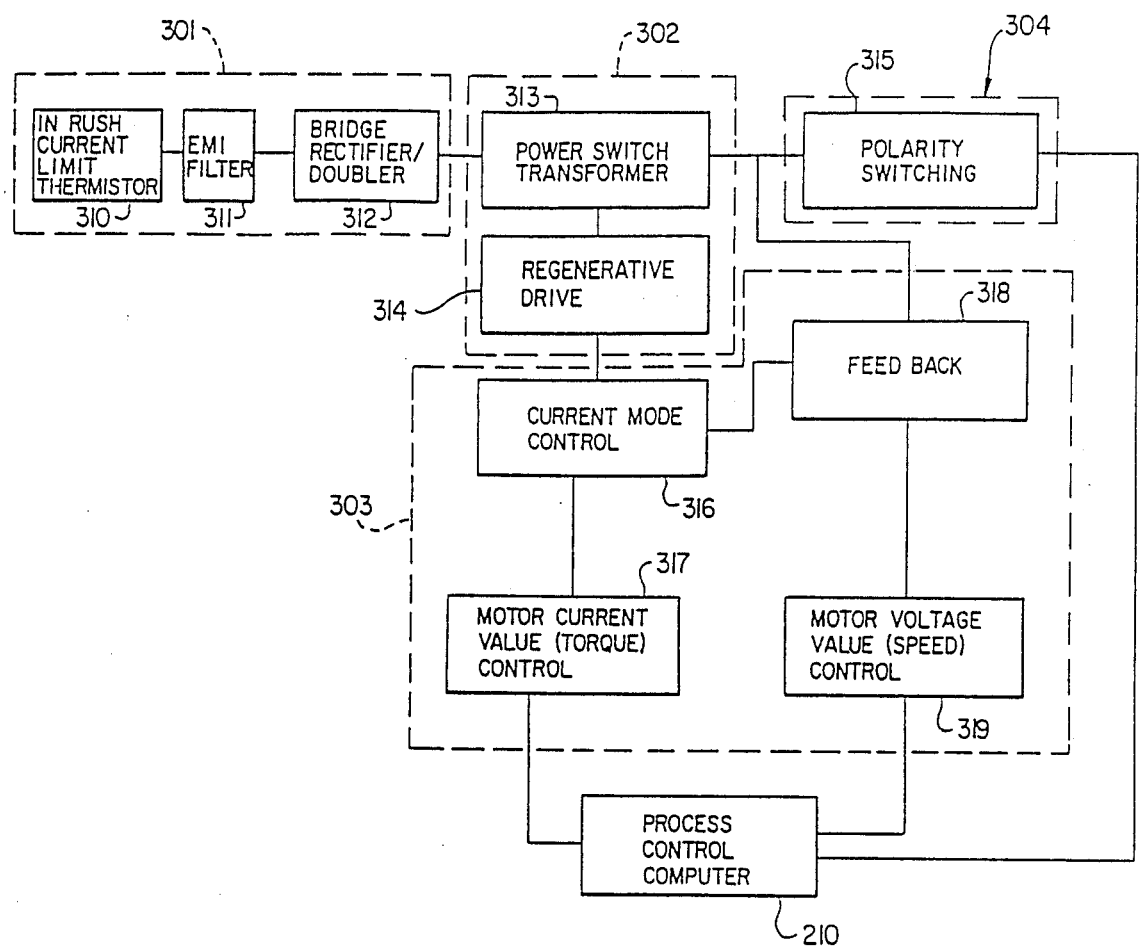
FIG. 8 is a block diagram of a programmable current regulated motor driver circuit used in the FIG. 7 embodiment of the threaded fastener assembly system constructed in accordance with teachings of the present invention.

Referring now to FIG. 8, there is shown a programmable current regulated motor driver circuit used in the FIG. 7 embodiment of the system Of the present invention. This circuitry is a similar embodiment to the motor driver current control circuitry of FIGS. 4 and 6, however, it does not include variable compensation and certain other features included within the embodiment of FIG. 6. Both circuits serve, however, to adequately drive the motor under current mode control and to effectuate the operation of the motor in accordance with the system of the present invention.

The motor driver circuit of FIG. 8 consists of an input section 301, a power switching and output filter section 302, a control feedback section 303, and an output polarity select section 304. The input section 301 consists of an in-rush current limiting thermistor 310, the output of which is connected through an electromagnetic interference filter (EMI) filter 311 into a bridge rectifier/doubler 312. The output of the input section 301 in connected into the power switching and output filter section 302 consisting of a power switching transformer circuit 313 which is connected to a regenerative drive circuit 314. The output of the power switching and output filter section 302 is connected to both an output polarity select system 304 which consists of a polarity switching circuit 315 and to a control feed back system 303. The control feedback section 303 comprises a current mode control unit 316 which is connected from the regenerative drive 314 and serves to provide an input to the motor current value control unit 317 which controls the motor torque. The polarity switching circuit 315, as well as the motor current value control circuit 317 and the motor voltage value control circuit 319, are coupled to the process control computer 210.

Within the input section 301, a fuse acts as a safety device which prevents large continuous current, such as due to component failure or to any other condition which causes a high current flow, and damages the other circuits. The EMI filter 311 compensates for the power switching section which generates large switching spikes due to rapid turning on and off of high current levels through an induction coil. This switching of currents can cause electrical interferences to be conducted back to the AC line source. The function of the EMI filter is to reduce these voltage spikes to acceptable levels.

The bridge rectifier 312 converts the 60 $H_z$ AC input voltage into pulsating DC and for a standard volt line, the bridge rectifier 312 is configured as a standard bridge giving it output voltage of 1.414 x RMS AC line voltage value of approximately 300 volts. For a 125 volt input line the bridge rectifier 312 is configured as a voltage doubler, giving a 2.8 x input voltage or approximately 300 volts. The bridge rectifier 312 also includes filter capacitors which convert the pulsating DC from the rectifiers into DC current with some ripple. The power section 302 converts the nominal +300 volts into a positive and negative DC voltage with a maximum peak current of approximately 15 amps and a maximum of ±40 volts.

Motor Control Circuit

Figure 9:
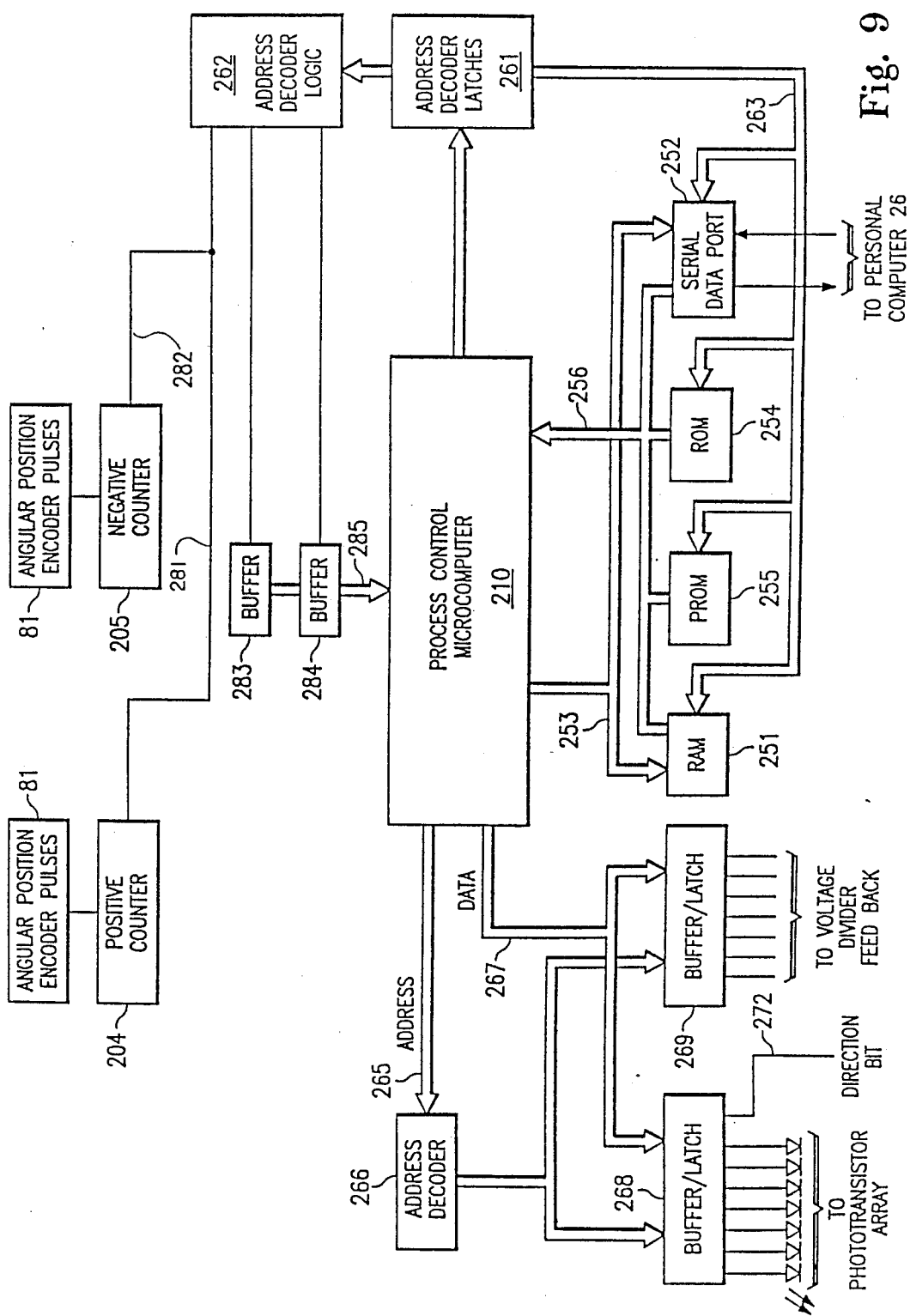
FIG. 9 is a block diagram of a motor control circuit used in the FIG. 7 embodiment of the system of the present invention.

Referring now to FIG. 9, there is shown a block diagram of a digital motor control circuit employed in the FIG. 7 embodiment of the system of the present invention. The process control microcomputer 210 is connected to output digital data to a random access memory (RAM) 251 and to a serial data port 252 by means of an output bus assembly 253. Similarly, the process control microcomputer 210 may receive information from a read only memory (ROM) 254, a programmable read only memory (PROM) 255 and the serial data port 252 by means of an input bus assembly 256. The serial data port 252 may comprise a conventional universal asynchronous receiver transmitter (UART). The serial data port 252 is connected to the host computer 26 used in conjunction with the present invention. The process control microcomputer 210 is also connected to an address decoder latch assembly 261 which is in turn connected through an address decoder logic circuit 262 to the peripheral angular displacement indicators. The address decoder latches 261 are connected by means of a bus 63 to select ones of the RAM 251, PROM 255, ROM 254, and serial data port 252 and for communication with the process control microcomputer 210. It should be understood that one of the components such as the RAM 251, the ROM 254, the serial data port 252 and the address decoder latches 261 may be included as an integral part of certain microcomputers such as the model Z8.

The microcomputer 210 is also connected by an address bus 265 to an address decoder 266 and by a data bus 267 to a pair of buffer/latches 268 and 269. The address decoder 266 selects which ones of the peripheral units of the buffer/latch 268 and the buffer/latch 269 are enabled for data communication with the microcomputer 210 by means of the data bus 267 The output of the buffer/latch 268 is connected to the phototransistor array associated with the opto-isolator and includes a direction bit coupled over lead 272. The output of the buffer/latch 269 is connected to the voltage divider feedback circuitry.

The peripheral angular position measuring circuits are connected by means of buffers to the process control microcomputer 210. Angular position encoder pulses from the motor shaft position encoder 35 are coupled into a positive counter 204 and a negative counter 205. The data output from counters 204 and 205 are connected via buses 281 and 282 and buffers 283 and 284, respectively, to the process control microcomputer monitor bus 285. The address latches 261 and address logic 262 select which of the buffers 283 and 284 are selected for communication with the process control microcomputer 210 via the monitor bus 285.

Thus, the process control microcomputer 210 receives information from its memory components 251, 254, and 255 as well as the host computer 26 via serial data port 252 and based upon stored programs and information input to it with respect to the motor shaft load monitored over monitor bus 285, provides output control information over output bus 267 to control the direction, speed, and torque of the motor.

Forward Converter Current Control Circuit

Figure 10:
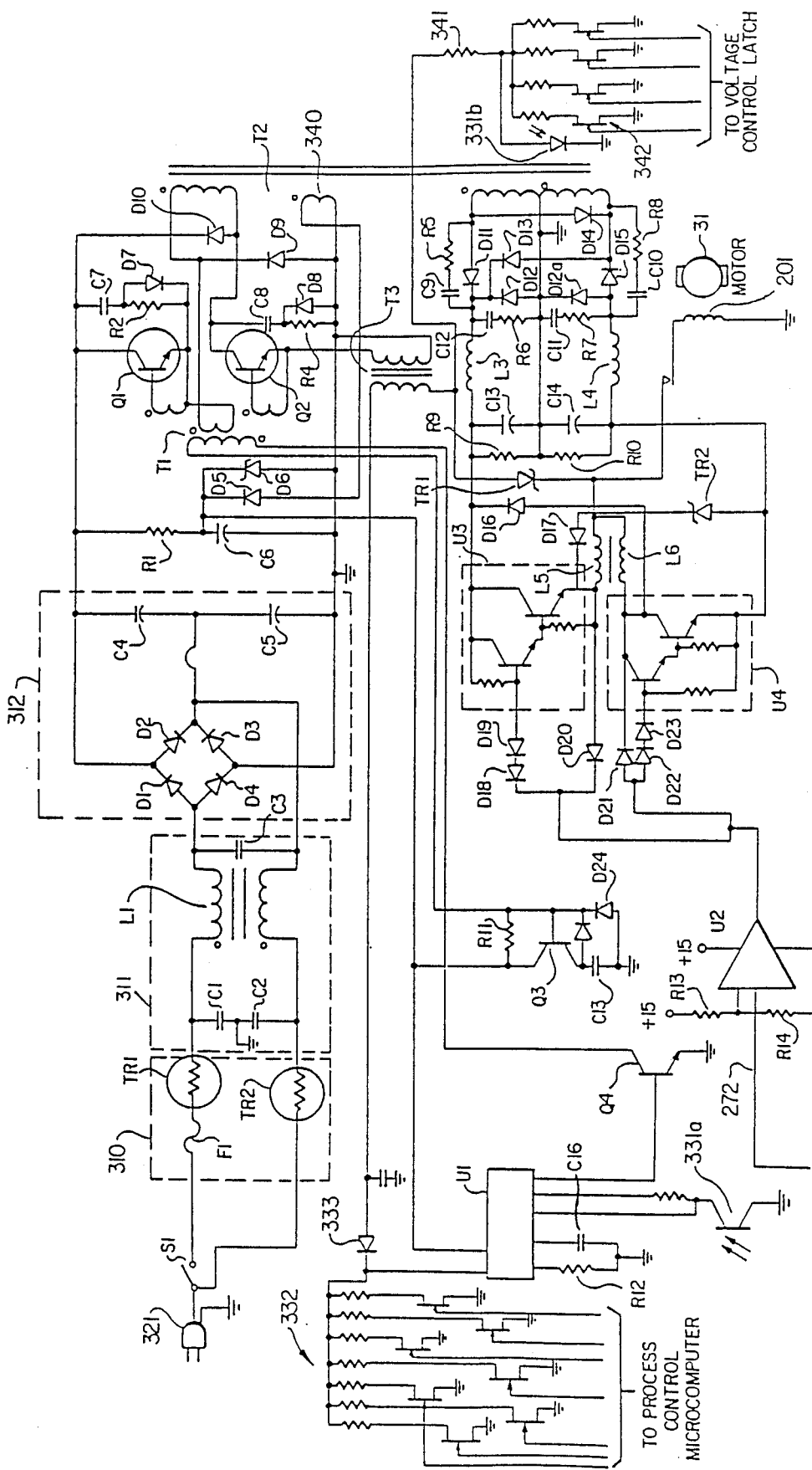
FIG. 10 is a schematic diagram of a motor drive circuit for the motor control circuit shown in FIG. 9.

Referring now to FIG. 10, there is shown a detail schematic diagram of a motor driver circuit of the motor control circuit shown in FIG. 9. The circuit is used to provide current mode control to the DC motor used in the FIG. 7 embodiment of the system of the present invention. This embodiment is particularly useful in applications which do not require a high speed transient response such as in a computer controlled exercise machine. Replacing the bipolar transistors with MOSFET transistors and adding a compensation correction circuit as shown in the embodiment discussed below in connection with FIG. 11, enormously increases the transient response of the system because of the higher switching frequency of the MOSFETS and optimized feedback compensation.

In the circuit of FIG. 10 an AC power source 321 is coupled through a switch S1 into the input of the input current limiting and protection section 310 which consists of a fuse F1 and a pair of thermistors TR1 and TR2, one connected in each side of the line. The output of the current limiting section 310 is coupled to the input of the EMI filter section 311 which consists of a pair of input capacitors C1 and C2 coupled across a common mode choke L1 the output of which has a capacitor C3 connected thereacross. The output of the EMI filter section 311 is connected to the input of the bridge rectifier section 312 consisting of 4 diodes D1, D2, D3, and D4 the outputs of which are connected across a pair of filter capacitors C4 and C5 which provide a rectified and filtered DC signal to the input of the power section. The power section of the motor driver control circuit consists of a power transformer, a regenerative drive and an output filter. The primary power section includes a power transformer T2 and a pair of power transistors Q1 and Q2 which are series connected with the secondary of a regenerative drive transformer T1. A snubber network is connected across the outputs of each of the two power transformers Q1 and Q2 and comprise, respectively, R2, C7, and D7 for the output of Q1 and R4, C8, and D8 on the output of Q2. The emitter of power transistor Q2 is connected in series with the primary winding of a current sensing transformer T3. Flyback clamp diodes D9 and D10 are connected across the windings of the power transformer T2, while input diode D5 and zener diode D6 are connected to the control voltage rail along with input current limiting resistor R1 and startup voltage capacitor C6.

Connected to the output of the power transformer is an array of output rectifier diode D11, D12, D13, D14, and D15. Output rectifier snubber networks R5 and R6 along with capacitor C9 and C12 are connected to one side of the output circuitry while output snubber networks comprising resistor R7 and C11 together with resistor R8 and capacitor C10 are connected to the other side. The positive side of the output circuit is connected through a coil 13 while the negative side of the output is connected through a coil L4 across which are coupled filter capacitors C13 and C14 and minimum load resistors R9 and R10.

The output polarity switching subsection of the power section comprises power hybrids U3 and U4 which are series connected with current limiting coils L3 and L4 along with Baker Clamps D18, D19, and D20 for hybrid U3 and D21, D22, and D23 fOr hybrid U4. Free-wheeling diodes D16 and D17 are connected across the power hybrids U3 and U4 which may comprise respectively, for example, models 645 and 646 Darlington hybrids, made by Unitrode. A phototransistor 331a of the opto-coupler circuitry, the photodiode of which is shown at 331b is coupled through the current mode control chip U1, which maybe a model 1846 manufactured by Unitrode. A direction bit lead 272 from the buffer latch (272 of FIG. 9) is connected to the input of a power operational amplifier U2 the other input of which is set at a voltage level by voltage dividers R13 and R14.

The control section of the motor driver circuit of FIG. 10 consists of the secondary of the current sensing transformer T3 which produces a voltage representative of the current through the primary and is connected to the input of the current mode control chip U1 through the diode 333. The ratio of the voltage going to the control chip U1 is controlled by variable burden resistor network 332. The gates of the field effect transistors of the variable burden network 332 go to the phototransistor array connected to the buffer/latch 268 of FIG. 9.

The chip U1 has a timing resistor R12 and a timing capacitor C16 connected thereto. A transistor Q4 is connected to the chip U1, the output of which is connected across the secondary of the regenerative drive transformer T1.

The current mode power supply of FIGS. 8, 9 and 10 is transformer isolated and the safe relatively low output going to the motor windings 201 is completely electrically isolated, with respect to DC current, from the dangerously high line voltage at 321 by the phototransistor array and the opto-isolator 331a–331b.

The motor driver circuit of FIGS. 8, 9 and 10 includes a modified two transistor forward convertor which operates at a nominal switching frequency of 40KHz and which produces a maximum of plus or minus 40 volts and plus or minus 15 amps to the current winding 201. Power coupled through switch S1 passes through fuse F1 and into thermistors TR1 and TR2. When the AC current is first applied, the AC filter capacitors C1 and C2 act like a dead short and produce a very large current surge until they are charged. Since thermistors TR1 and TR2 are cold they have a very high resistance and limit this in-rush of current. As the current continues to flow through the thermistors TR1 and TR2 they heat up, decrease their resistance and, thus, limit the startup current but do not dissipate a large amount of power during normal running conditions. The filter section consisting of filter capacitors C1, C2, and C3 and inductance L1 serves to limit the amount of electrical interference coupled back into the AC line source due to the rapid switching on and off of large values of current through an inductor in the power switching section. The EMI filter 311 reduce these current spikes to acceptable levels. The rectifier/doubler 312 which consists of diodes D1, D2, D3, D4, and output filter capacitors C4 and C5 convert the 60Hz line current into pulsating DC the output of which is approximately 300 volts for both a 220 volt input as well as a 125 volt input line.

The power switching section converts the nominal plus 300 volt rail voltage into a positive and negative DC voltage with a maximum peak current of 15 amps and a maximum plus or minus peak voltage of 40 volts. This circuit is composed of 3 subsections a primary side switching section, a regenerative drive section, and an output rectifier filter. The primary side switching section consists of power switching transistors Q1 and Q2 which are connected in series with the primary of power transformer T1. The DC rail voltage is converted to pulses by switching these transistors simultaneously completely on and completely off. By controlling the ratio of the time on to the time off, i.e. the duty cycle ratio, the ratio of input voltage to current on the one hand to output voltage to current on the other hand can be precisely contrOlled since changing the duty cycle ratio has the same effect as chánging the turns ratio of a transformer.

In order to reduce the peak voltage seen by the power transistors Q1 and Q2 the two are connected in series so that peak voltage rating requirements for each one are reduced in half. The flyback voltage when the power transformer T2 resets is returned to the DC rail by flyback clamp diodes D9 and D10. At startup, power from the DC rail is current limited by R11 and capacitor C5 stores enough energy to power the regenerative drive until the voltage from the primary transformer auxiliary winding 340 is sufficient to power the primary side of the control circuit.

The snubber networks, C7, D7, and R2 connected across power transistor Q1 and R4, C8, and D8 connected across power transistor Q2 protect the power transistors during the turn-on and turn-off thereof thereby preventing inductive spikes from exceeding the safe operating limit of the transistors. The regenerative drive subsection of the power section of the motor driver circuit of FIGS. 8 and 10 operates so that when the driver transistor Q4 is on, the power transistors Q1 and Q2 are off. The magnetizing current in the control winding of the regenerative drive transformer T1, approaches a limiting value equal to the control circuit voltage divided by the current limiting resistor R1. Capacitor C13 is discharged at this time. The only voltage on any winding of the regenerative drive transformer is due to wire resistance. When the output from the control chip U1 becomes high, the driver transistor Q4 turns off and the energy stored in the inductance of regenerative drive transformer T1 causes a flyback voltage to be developed on all windings of the transformer T1. This voltage momentarily forward biases the base-emitter diodes of the power transistors Q1 and Q2, and collector current starts to flow. The collector current value divided by the turns ratio of the regenerative driver transformer T1 also flows to the base of power transistors Q1 and Q2. The ratio of base current to collector current set by the turns ratio of the drive transformer T1 is slightly more than the minimum beta of driver power transistors Q1 and Q2. Thus, once turned on, the current through Q1 and Q2 rapidly increases until these transistors are completely turned on. During the time that the power transistors Q1 and Q2 are on, control transistor Q4 is off, and current through R11 and R1 is multiplied by the gain of transistor Q3 rapidly charging capacitor C13. At the end of the on period, the control circuit turns off which in turn turns on drive transistor Q4 applying the voltage stored in the capacitor C13 to the regenerative drive transformer T1 driving the bases of power transistors Q1 and Q2 sharply negative. This negative voltage on the base of power transistors Q1 and Q2 turns both of them rapidly off as the turn-off current pulse is much larger than the base current through the transistors Q1 and Q2. Thus, turn-off time is very rapid.

When the power transistors Q1 and Q2 are off, no base current flows, and any remaining voltage from capacitor C13 flows through the regenerative driver transformer T1 adding to the energy stored in the transformer inductance. The diode D24 prevents driving the upper end of the regenerative driver transformer negative. After startup, the power transistors Q1 and Q2 are alternately switched on and off in a manner described above until source power is removed.

The output from the secondary of the regenerative drive transformer is center tapped and produces an output voltage/current of equal amplitude but of opposite polarity. Diodes D11 and D15 are forward biased when the switching power transistors Q1 and Q2 are on. Current flows through these diodes and the filter inductors L3 and L4 so that the voltage across these inductors is positive thereby reverse biasing the free-wheeling diodes D12 and D13. When the power switching transistors Q1 and Q2 turn off, the voltage developed by the secondary of the output power transformer T2 reverses polarity as the transformer resets. The diodes D11 and D15 are then reversed biased and the voltage across filter inductors L3 and L4 also reverses polarity forward biasing the free-wheeling diodes D12 and D13 and thus, allowing current to continue to flow in the inductors. The snubber networks R5, C9, and D11 in one side Of the secondary and R8, C10, and D15 in the other side prevent large inductive spikes from occurring due to diode transition times.

The output voltage from the secondary of the power transformer T2 is smoothed by filter capacitor C13 and C14 while minimum load resistors R9 and R10 provide a minimum load resistance and thus prevent switching noise from charging the output filter capacitors to a damaging level and, further, allow a minimum current to flow through filter inductors L3 and L4.

Two special zener diodes TR1 and TR2, known as transorbs, are specifically designed to fail to a shorted condition, should the voltage across them rise above a specified level, i.e. 40 volts. These diodes guarantee that no potentially hazardous voltages are developed on the secondary, and hence, user accessible, side of the power transformer for applications where such is required.

The output voltage from the forward convertor of FIG. 10 is determined by the ratio of the time the power transistors Q1 and Q2 are on, as compared to the time they are off. The control section precisely sets this ratio on a cycle-by-cycle basis 40,000 times per second allowing very precise control of the peak output voltage and peak output currents. The control section of the circuitry of FIG. 10 uses what is known as current mode control which consists of a primary feedback loop which senses the current through primary of power transformer T2 and a secondary of power transformer T2. The specialized current-mode control chip U1, incorporates an oscillator, power transistor drivers, a current sense comparitor, a feedback voltage operational amplifier, and a precision voltage reference.

The operation of the current sensing loop is such that when power transistors Q1 and Q2 are on, current flows through the primary of the power transformer T2, the regenerative drive transformer T1 and the current sensing transformer T3. Because of the inductance in these transformers, the current will ramp in a linear fashion and be divided in a 200 to 1 ratio by the current sensing transformer T3. This current is then rectified by the diode 333 and converted into a voltage by oontrollable burden resistor network which consist of field effect-transistor/resistor pairs 332. Depending on the binary combination of the state of these seven transistor/resistor pairs, the burden resistance of the current sense transformer T3 is computer controlled, thus allowing an adjustable limit to 1 of 128 different levels. When the voltage level representing the intercurrent loop reaches the reference voltage value, a comparitor causes the output drivers of control chip U1 to change state and power transistors Q1 and Q2 are latched off until the internal clock of the chip U1 turns them back on again. The control chip oscillators are configured so that if the output transistors are not turned off before the duty ratio reaches 50 percent, then the chip switches them off automatically thus allowing all transformers to properly reset.

The peak output voltage from the motor driver circuitry of FIG. 10 is controlled by a second feedback loop optoisolated from the primary control section. The feedback consists of the output voltage divided by a computer controlled voltage divider network. The output of this voltage divider network is set at the level of the voltage reference contained in the control chip U1. By changing the ratio of these resistors, the peak output voltage can be changed. The ratio of this network resistance is computer controlled by having a fixed resistor 341 in series with parallel combination of series connected resistor fieldeffect transistor combinations the resistance of which depends upon the binary combination of the state of the resistor/field effect transistor network 342. The effective ratio of the voltage divider network is controlled by the process control computer. If the output voltage which is fed to the primary circuit through an isolation network rises above the reference voltage at the noninverting input of the feedback operational amplifier contained in U1, the output of this amplifier will be driven to a lower level which is determined by the gain of the operational amplifier. This voltage is used as a reference voltage for the intercurrent loop comparitor. If the current limit section does not allow full output voltage to be reached at the current level desired, then the reference voltage will be left in its highest level.

In the output polarity switching section, the convertor generates a plus and minus nominal 40 volts. The direction of the motor torque is determined by which polarity from the convertor is selected. This is accomplished by power operational amplifier U2 powered by a plus and a minus 5 volts from an auxiliary power supply turning on Darlington hybrid circuits U3 and U4, depending on whether the direction bit on lead 272 from the control computer is high or low. Diodes D18 to D23 form Baker Clamp circuits allowing fast switching response of the Darlingtons. Coils L5 and L6 limit current spikes during cross conduction time. The diodes D16 and D17, which are part of the Darlington hybrids U3 and U4 are free-wheeling diodes which prevent inductive turn-off voltage spikes due to the high inductance of the motor field winding coil 201.

Thus it is seen that the process control microcomputer 210 maintains very precise control over the polarity, voltage and current of the signal which is delivered to the winding 201 of the motor 31. This enables the computer to precisely vary the torque of the motor and make precise changes therein so as to conform to the requirements of the program as well as the responses of the load as the system is operated.

High Speed Current Control Circuit

The above discussion of the motor control circuitry relates to an implementation of the system of the present invention employing a forward converter and relatively slow bipolar switching transistors. Alternative implementations are possible utilizing other current control devices such as either linear regulators or switch mode regulators, including a buck regulator, a flyback regulator, a half bridge regulator, a full bridge regulator, a boost regulator, and combinations thereof.

Figure 11:
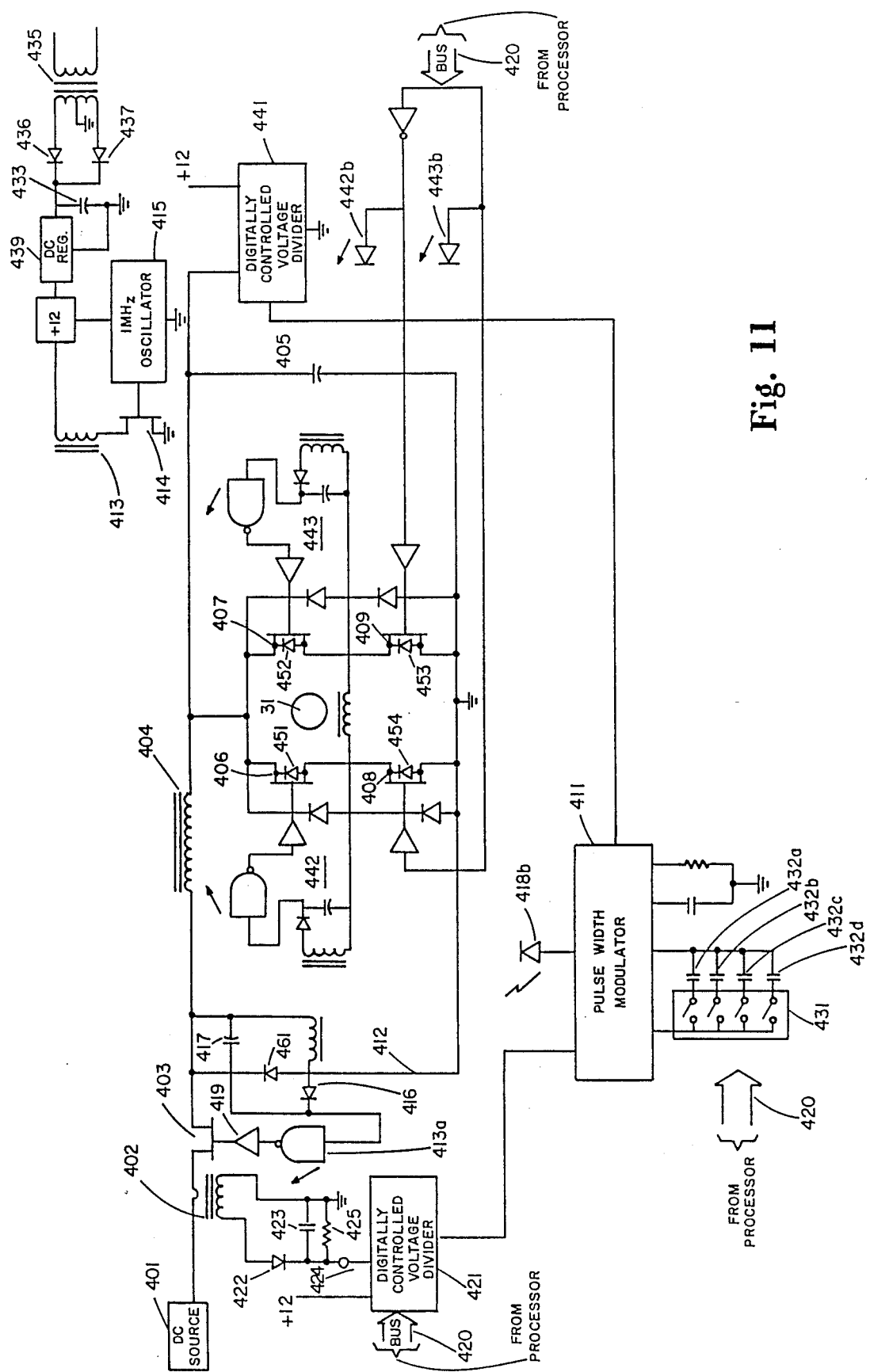
FIG. 11 is a schematic of a motor driver for the FIG. 4 embodiment of the system of the present invention.

In FIG. 11 there is illustrated a current mode control motor drive circuit for the FIG. 4 embodiment of the system of the present invention as implemented with a buck regulator, high speed MOSFET switching transistors and variable feedback compensation. The current regulator includes a DC voltage source 401 connected through the primary of a current sense transformer 402 into a regulator switch 403 comprising a MOSFET transistor. The source 401 is series connected to a small filter inductor 404 and is connected in parallel with a filter capacitor 405. The line inductor 404 and the capacitor 405 are also connected to a bridge circuit comprised of MOSFETS 406, 407, 408 and 409 and then to ground. Selected diagonal pairs of MOSFETS 406–409 are simultaneously turned on in accordance with the state of a signal from the processor control computer. Depending upon which pair of MOSFETS is turned on, the direction of current through the motor 31 is thereby determined by the process control computer. A conventional delay circuit (not shown) may be incorporated such that all four transistors of the bridge are never turned on simultaneously.

Regulating MOSFET transistor 403 is turned on and off by signals generated by a control circuit which may comprise an integrated pulse width modulator 411 which may be, for example, a Model UC-3842PWM IC manufactured by Unitrode Corporation. A voltage referenced to the drain of MOSFET 403 is generated by a transformer secondary 412 the primary side of which, 413, is connected to a +12 volt source and driven by another MOSFET transistor 414 and a 1MHz oscillator 415. The current passing through the secondary winding 412 is rectified by a diode 416 and filtered by a capacitor 418a. An opto-coupler 418a, such as a 6N137-1opto-coupler, turns on a driver amplifier 419, such as a 4050 driver, which then turns MOSFET transistor 403 on and off in accordance with the signal from the pulse width modulator 411. The operation of the pulse width modulator 411 is such as to provide current mode control in accordance with a typical buck regulator application of power MOSFETS. The detailed operation of such circuits is known to those skilled in the art and is, for example described in Application Note U-100 for the UC3842 Integrated Pulse Width Modulator, published at pages 220–231 of the Unitrode Corporation Application Manual.

The output voltage from the pulse width modulator control chip 411 is connected to the photo-diode portion 418b of the opto-coupler 418a. The high side of the opto-coupler 418a is connected through an amplifier 419 to the gate of pass transistor 403 to turn it on and off. The outputs from the digitally controlled voltage dividers 421 and 441 are connected to the inputs of the pulse width modulator chip 411. This device, may comprise, for example, a Model PM-7524 8-Bit Buffered Multiplying D/A Converter manufactured by Precision Monolithics, Inc. and configured as a voltage divider with digitally controlled gain, which is known to those skilled in the art and is illustrated, for example, in FIG. 9 of the Precision Monolithics Data Book (pages 11/150–11/158) (1/86 Rev. A).

Generally speaking, this device controls the proportional division of an input voltage in accordance with a received digital signal to produce a fractional value of the input voltage as its output. the value of the input voltage to the digitally controlled voltage divider 421 is proportionally divided in accordance with a signal received on the bus 420 from the process control computer. This proportionally divided voltage is output to the pulse width modulator control chip 411, which controls the PWM ratio of the MOSFET transistor 403.

Current sense signals are developed by the transformer 402. The current from source 401 through the transformer 402 is stepped down in direct relationship to the turns ratio of that transformer, for example, 100 to 1. A diode 422 rectifies this current, and a capacitor 423 and a ferrite bead 424 form a filter network to eliminate the capacitive spike caused by the initial turn-on of MOSFET 403. The resistor 425 converts the rectified current into a voltage which is directly proportional to the current flowing through the transformer 402. The value of this voltage is ratiometrically controlled by the digitally controlled voltage divider 421 in accordance with the digital signals from the process control computer via bus 420. Depending upon the division ratio set by the digitally controlled voltage divider 421, the output of the PWM control chip 411 is varied through the opto-coupler 418a-b to control the peak current flowing through MOSFET 403. Thus, that peak current is controlled by the process control computer. Since the peak current sets the ratio of the time-on to the time-off of MOSFET 403, and also the RMS value of the current through the motor 31 this current is thereby controlled by the microprocessor.

As the voltage and/or current feedback loops are varied by the microprocessor, and, depending upon whether the motor 31 is serving as a motor or as a generator, the compensation needed for maximum transient response varies. An analog switch 431 which may include, for example, a Model 4066 Analog Switch made by Motorola, controls a series of capacitors 432a–432d which can be preferentially switched in or out of the circuit by the signal on the bus 420 which controls the state of the analog switch 431. Thus, the processor signal changes the feedback compensation to allow maximum transient response of the system with good stability margins under varied operating conditions of the motor 31.

A separate power supply generated by conventional means including a step-down AC transformer 435, rectifying diodes 436 and 437, a filter capacitor 438 and a linear regulator 439 is used to power the digitally controlled voltage dividers 421, 441 and the analog switch 431 as well as to generate drain referenced voltages for all of the MOSFET transistors where the drains are not referenced to ground, i.e., MOSFET 403, 406 and 407. MOSFET transistors 406 and 407 are driven on and off by the same method described above for 403 under control of their respective opto-coupler control circuits 442 and 443.

Diodes 451–454 allow current flow around the steering MOSFET transistors 406, 407, 408 and 409 such that if the transistors are not simultaneously switched on or off, the inductive energy in the motor coil cannot form a dangerously high voltage spike which could destroy the MOSFET transistors.

Diode 461 allows current to flow through inductor 404 when MOSFET regulator transistor 403 is off. During this period inductor 404 sources current. When regulator transistor 403 is on, current flows from the voltage source 401 storing energy in inductor 404 as well as providing energy to the motor 31. The ratio of time when the inductor 404 sources current to the time when the inductor 404 stores power determines the total amount of current, averaged over time, flowing through the motor 31.

It should also be noted that other types of current regulation schemes could be used to generate a precisely controlled current for driving a motor in accordance with the teachings of the present invention. For example, in the above referenced Application Note U-101 of Unitrode Corporation, pages 234–242 and entitled "200 KHz Current-Mode Converter Provides 500 W: there is shown a centered-tap pushpull topology operating with a continuous inductor current in current mode control. In this system the current regulating scheme uses an artificially generated ramp instead of the current flow through the motor. The steering transistors themselves are ratio-metrically controlled directly, and no external chopping transistor such as MOSFET 403 of FIG. 11 is used.

In addition, there is also available a chip from the S.G.S. Corporation which controls the voltage or current in response to bi-directional analog signals through a motor. This chip is a two quadrant controller with current limit, rather than current control. The digital signals from the process control computer must first be converted into analog signals by a digital to analog converter in order to implement this chip.

Operation Calculations

As is briefly set forth above, the accuracy with which the system of the present invention can measure a force of opposition to the angular movement of the motor shaft is dependent upon the dynamic calibration of the system prior to operation. In particular, the system must be run through a standard calibration routine in which a number of parameters are evaluated and used to build look-up tables within the memory of the microprocessor and/or host computer to enable a selected evaluation of current, force, mass, velocity and/or acceleration during the operation of the system.

In general, the technique used for calibration is that the system is first run through a setting of a plurality of selected values of current through the windings of the motor with no external load on the shaft. For each of the different values of set current, successive values of shaft angular displacement as a function of time are measured and used to calculate velocity and acceleration. Thereafter, these data comprising a plurality of associated values of current and acceleration of the motor shaft with no external load are stored in the table. Next, a mass of known value is affixed to the operating shaft of the motor and the process of successively setting a plurality of selected current values while measuring the periodic displacement of the operating shaft as a function of time, is effected so that corresponding values of velocity and acceleration may be measured and calculated with a known load. Thereafter, the system stores said plurality of associated values of current and acceleration of the shaft when loaded by the known mass.

Next, successive values of shaft acceleration with no load are subtracted from the corresponding successive values of shaft acceleration with the known load. Both sets of successive values were previously stored and the difference value is now stored. For each value of acceleration difference calculated, the net force produced on the shaft of the motor is calculated for each preselected value of current. The system then stores in a look-up table each of the net force values in association with a corresponding binary number which establishes a set current value.

The calibration routine of the system next employs the setting of successive values of current through the windings of the motor with the motor shaft fixed to an unknown load. The system successively measures the angular displacement of the actuator with the unknown load affixed thereto as a function of time and calculates therefrom successive values of velocity and acceleration. Thereafter from a table of current, time, displacement, velocity and acceleration, and by use of the basic Newton's Law, Force=Mass times Acceleration (F=MA), and data taken from the previous tables of force with a known mass as a function of current through the windings of the motor, the program selects a particular force corresponding to the current measured. Thus, the unknown force is equal to the looked-up force for the measured current for the selected value of acceleration chosen.

The force produced by setting a known value of current through the motor is also affected by the motor temperature. Using the above described methods to determine the force output by the motor for each binary number at selected motor temperatures allows an additional error table to be established for correction of force differences as a function of temperature. For example, the rotor of the motor may be stalled and a high current put through the windings to raise the temperature of the motor. Thereafter, the shaft is released and the output force of the motor measured in accordance with the above produces at a plurality of selected discrete temperature values and a fixed current. These data are then stored in a correction table for motor temperature to be used by the processor in its calculations.

With these data stored, a dynamic force measurement can be made of a shaft under load by fixing successive currents through the windings of the motor and measuring the acceleration of the shaft for the current set. Thus, with known accelerations, known forces (set currents), and known masses, it is clear that:

$$F_{total} = F_{set\ force} + F_{unknown} = MA$$

Thus:

$$F_{unknown} = F_{total} - F_{set}.$$

In this way, the system can use the unknown force to control function operations.

Figure 12:
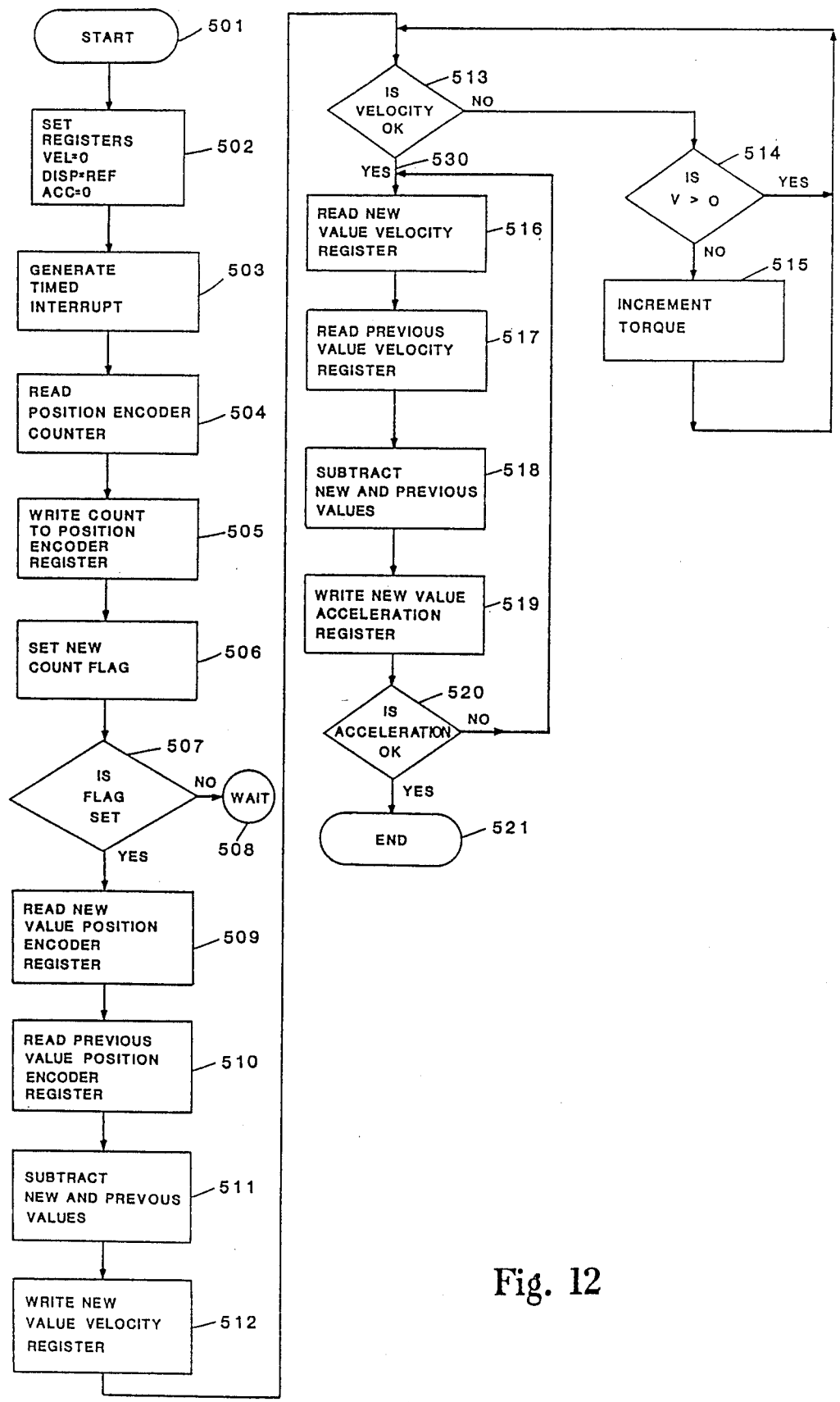
FIG. 12 is a flow chart illustrating the manner in which velocity and acceleration values are determined in the system of the present invention.

There is shown in FIG. 12 a flow chart illustrating the manner in which the programming of the system of the present invention calculates velocity and acceleration values so as to be able to calculate unknown forces opposing the rotation of the shaft of the motor of the system. As shown in FIG. 12, the system starts at 501 and at 502 the system initializes its internal registers including setting velocity equal to zero, acceleration equal to zero, and displacement equal to some reference value which might also be zero. At 503 a timed interrupt is generated in which to perform the various reading operations. In particular, this time interrupt at 503 may be as fast as on the order of 300 nanoseconds for the Super Z8 microprocessor and regardless of what else the processor is doing, these interrupts are always generated. At 504 the system reads the position encoder counter and at 505 writes the count contained within the position encoder counter into a position encoder register. At 506 a new count flag is set or incremented. At 507 the system asks whether or not the flag is set yet, and if not, the system waits at 508. If the flag has been set, the system goes on to 509 at which a new value in the position encoder register is read. At 510 the previous value of the position encoder register is read and at 511 the new and previous values of subtracted and an encoder displacement value change as a function of time is calculated as velocity. At 512 the new value of velocity just calculated from the difference between the encoder displacement charge per unit of time elapsed is written into the velocity register. At 513 the system tests whether or not the velocity value recorded is okay or not. That is, at this step the system is asking whether or not the shaft is moving. If not, the system asks at 514 whether the velocity is greater than zero. If not, torque is incremented at 515 and the system returns to 513 to check the velocity again. If it so happens that the velocity is not greater than zero at 514, then the system also goes back and checks the velocity again at 513 until it gets a yes.

After the velocity has been checked to be okay at 513, the system continues to calculate successive values of velocity and reads at 516 a new value from a velocity register and at 517 reads the previous value in the velocity register. At 518 the new and previous values of velocity are subtracted and, by means of the change in velocity per unit time, an acceleration value is calculated. At 519 a new value of acceleration is written into the register. At 520 the system checks whether or not the calculated value of acceleration is okay by comparing it to an arbitrary preset value to ensure that the value determined is within some reasonable range of values. If not, the system returns to 516 and beings the acceleration calculation subroutine again. If the acceleration is determined to be okay at 520 the program ends at 521.

Calibration and Measurement Determination Procedures

A calibration procedure is needed in the system of the present invention because of several non-linear second order effects which affect both the value of the current and the forces produced by the current. For example, the burden resistance in the motor driver circuit which sets the current has a finite tolerance, as does the voltage reference in the pulse width modulator control chip. In addition, the torque constant (K) of each electric motor will vary somewhat from motor to motor, the digital-to-analog converters (used as digitally controlled voltage dividers) in the feedback loop have finite tolerances, and the RMS value of the current changes somewhat as the current slope changes. These and other variable parameters within each system of the present invention requires that a procedure be used to calibrate the system.

The system force values may be calibrated in a static manner by affixing the driveshaft of the electric actuator to a device which accurately measures the static torque of the driveshaft for varying values of motor current. This procedure is done for each force number output by the microprocessor and, thus, assigns a specific value of force to each binary number used to control the digitally controlled current regulator. In this calibration procedure, the force values may be read by hand, and then manually input into the computer or they may be electronically read and directly input into the computer by electronic means.

A dynamic calibration procedure may also be used to determine a value of torque for each binary number output by the process control computer to the digitally controlled current source and, thus, to calibrate the system. This procedure is based upon Newton's Second Law of dynamics, $F=MA$, and consists of five steps:

1. The mass of the rotor and the driveshaft of the motor, as well as the frictional resistance of the shaft bearings are dynamically determined.

2. Once the mass is determined by step 1, the force can be determined by measuring the acceleration using the equation Force=Mass x Acceleration.

3. Once force is determined by using step 2, additional unknown masses can be determined by measuring acceleration and then determining the total mass of the system and subtracting the known mass therefrom using the value of force determined in step 2.

4. Once the total masses fixed to the driveshaft are known by using step 3, the additional forces opposing or resisting the movement of the driveshaft may be measured by measuring the acceleration. Acceleration and mass are both known and, therefore, the total forces must be the product of these two values. The total effective force on the driveshaft is the sum of the known motor force, set by the process control computer, and the unknown forces, affecting movement of the driveshaft. By subtracting the known force from the total force, the unknown force is determined.

5. By setting the acceleration equal to zero, the inertial forces caused by the total mass are eliminated and only the external forces such as friction resistance, or forces developed by the load, affect the acceleration. This fact allows determination of the bearing resistance force and subtracting this force value from the known force developed by the motor, thus allowing complete determination of motor and driveshaft inertia, as well as friction forces opposing rotation of the shaft.

By using combinations of steps 3, 4 and 5, unknown masses and/or unknown forces affecting the movement of the driveshaft can be completely determined quickly and accurately, with no external measurement devices being used to determine current, mass, or force.

By increasing the number of digital bits which set the value of the current produced by the digitally controlled current source, and thus set the motor torque, the angular resolution of the encoder and the frequency and accuracy of the clock, the system accuracy may be increased to any level required for a particular application. Since the system is binary in nature, the acceleration cannot be set to absolute zero, and some deviation from this value, which is determined by the required accuracy of the system must be allowed. The value of acceleration and/or velocity may also contain small errors due to the binary nature of the system. These errors can be reduced by averaging a number of samples, and using this averaged value as the value of acceleration. Many different averaging techniques can be used to accomplish this goal, depending upon the needs of the individual application.

A more detailed explanation of the calibration procedure of step 1, set forth briefly above, is as follows:

A preselected binary number is input to the digitally controlled current regulator connected to the motor with no load affixed to the driveshaft of the motor. This binary number is recorded and the acceleration computed and stored in the memory of the process control computer. Next, a calibrated, known mass is affixed to the driveshaft and the same binary number read into the digitally controlled current source. A new value of acceleration is then computed with the known mass affixed. Since the two binary numbers and thus the two set forces are equal, the mass-acceleration product of each must also be equal, because if two equations are equal to the same constant, they are equal to each other.

Since the two equations are equal, the mass of the shaft and rotor (M1) times the first value of acceleration must equal the sum of the calibrated weight (M2) plus M1 times the second value of acceleration (M1×A1=(M1+M2)×(A2)). Rearranging terms M1, (which is the heretofore unknown mass of the shaft and rotor), equals M2 (which is the calibrated weight), times A2 (the second value of acceleration) divided by A1 minus A2 (the algebraic difference in accelerations) (M1=A2×M2/(A1−A2)). This allows an accurate determination of the mass of the motor shaft and rotor, putting this now known value of mass into the equation force=mass (M1)×acceleration (A1) allows complete determination of the force output by the motor for that binary number, since both mass and acceleration are completely determined.

This initial value of mass, as calculated above, is then used in conjunction with a calculated value of acceleration to establish a calibrated level of force for the particular binary number used. The process is repeated for each binary number employed by the process control computer in setting current values from the digitally programmable current source.

Using the equation $F_{total}$=MA and once M and A are completely determined using the above procedure, $F_{total}$ is known. By setting A=0, the inertia force of the rotating member is zero and the value of $F_{total}$ equals the frictional resistance forces of the bearings.

Alternatively, to avoid measuring each value of current and force for each binary number, once the first value of force is precisely determined, the remaining values of force can be determined by linear ratio derived from this calibrated force level.

Once a table relating a binary number to a level of force at a given velocity is obtained, and the inertia force of the rotating parts of the motor is known, varying the current to obtain a preselected value of acceleration allows determination of unknown masses affixed to the driveshaft.

Since acceleration and force are known using Newton's equation, F=MA, the value of the unknown mass can be determined by this method. By storing this value of mass in the process control computer, and normalizing the value of mass to one, the simplified equation then reads F=A. As values of A and F are recorded, the stored value of mass can be used by the process control computer to calculate the true value of force.

$F_{total}$ is the algebraic sum of the known calibrated force determined by the binary number output to the digitally controlled current regulator, that is $F_{set}$, the set force, plus the unknown forces, $F_{unknown}$, which equal acceleration if the mass is normalized to one, i.e. F=A. Since A is determined by the procedure described above, and $F_{set}$ can be determined from the look-up table obtained by the procedure also described above, the difference, $F_{unknown}$, can be easily determined by subtracting $F_{set}$ from $F_{total}$, thus allowing complete determination of the forces opposing or resisting the rotation of a driveshaft of the motor.

Software

The calibration procedure described above consists of a group of software subroutines which can be sequentially called from memory to either calibrate or operate the system.

These subroutines consist of a general subroutine which calls the value of torque and reads encoder counts and direction to calculate and record either velocity, acceleration, or both. this subroutine is shown and described above as FIG. 12. A second subroutine of FIG. 13, sets acceleration and varies torque to obtain a preselected acceleration value. The second subroutine of FIG. 13 utilizes the first subroutine of FIG. 12, or parts thereof, to accomplish its task. A third subroutine (not specifically shown) sets velocity and varies torque to obtain a selected velocity. The third velocity set subroutine is virtually identical to the second acceleration set subroutine of FIG. 13 except that only velocity values are calculated instead of continuing on to calculate acceleration values.

Additional programs utilizing these three subroutines may determine either unknown masses or unknown forces, depending upon which combination of subroutines is used.

Referring back to the flow chart of FIG. 12, this program contains several subroutines which allow both velocity and acceleration to be determined separately or in combination. The program starts at 502 by setting initial conditions of velocity and acceleration to zero, although if appropriate, parameters other than zero can be set in these registers. Next, at 503 the program generates a high priority timed interrupt, which takes preference over all other activities of the processor. When this interrupt occurs, the program exists to a subroutine which reads the encoder counter at 504, stores the values in a register at 505, and sets a new count flag at 506. It then returns to the main program, which checks to see if a new count flag is set at 507, and may go into a wait state at 508 until the flag is set by the timed interrupt. Once the new count flag is set, the program exists to the subroutine for calculating velocity at 509. This subroutine reads the encoder register at 509, and then the velocity register at 510, subtracts one from the other at 511 and stores the new value in the velocity register at 512. It then returns to the main program, which performs a check to determine if the velocity is okay at 513. If the velocity is okay, the program may either end at 530 or continue on to call an acceleration calculation subroutine. This acceleration calculation subroutine which begins at 530 reads the new velocity value at 516 and the old velocity value, subtracts the two at 518, and writes the value to the acceleration register at 519. The program then checks to see if the acceleration value is within a prescribed tolerance at 520. If so, the program returns to the main sequence and, if nOt, the program returns to 530 to recalculate acceleration and disregards the previous value.

Figure 13:
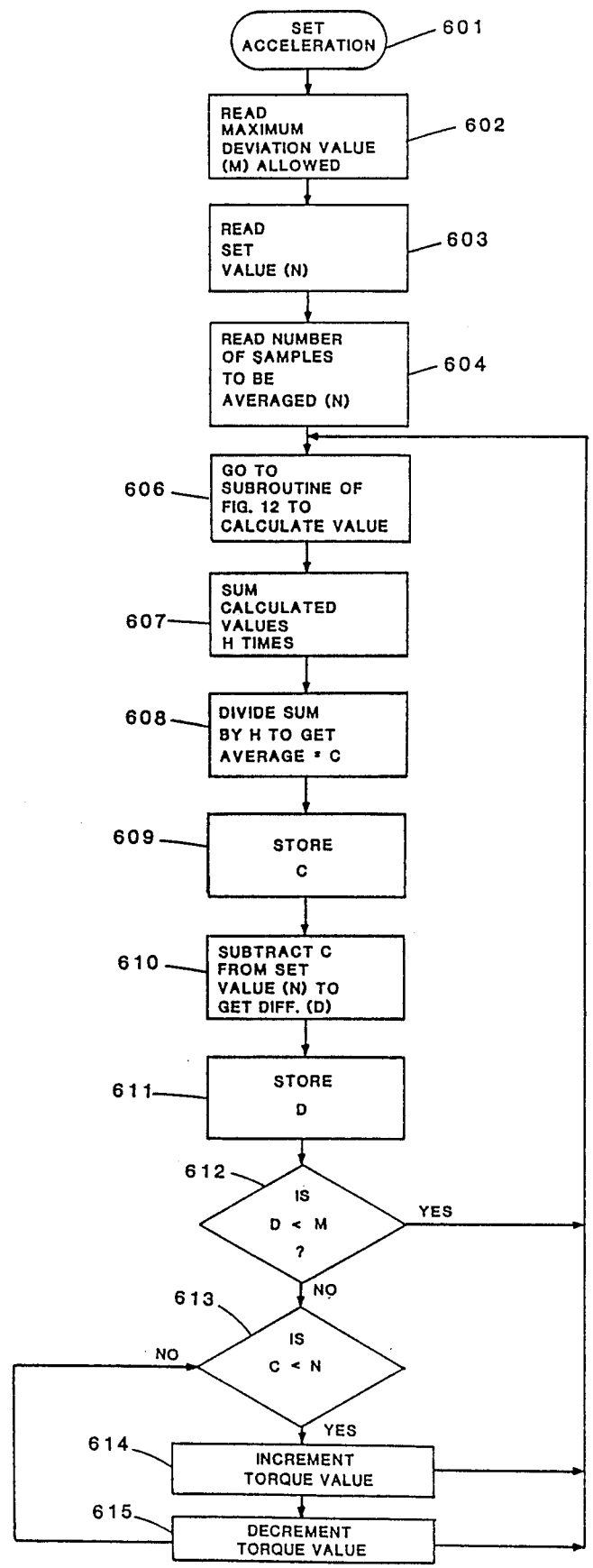
FIG. 13 is a flow chart illustrating the manner in which the system of the present invention sets acceleration and velocity.

The set acceleration/velocity subroutines of FIG. 13 begins at 601 and at 602 and reads from memory a preselected value M. This value is the maximum permissible deviation of either acceleration or velocity, which ever is being set by the subroutine, from the selected value N, which is the desired value of acceleration or velocity being set by the subroutine. Only accelerations will be discussed below, however, the steps apply equally to setting velocity as should be clear from the flow chart itself.

Sometimes it is desirable to average the value of acceleration over a number of counts. The value H is the number of counts to be averaged. If no averaging techniques are needed, H=1. Next the program calls the routine which determines acceleration as described above.

After reading in the value of M from memory at 602, the system reads in values of N at 603 and H at 604. At 606 the routine of FIG. 13 calls in the routine of FIG. 12 to repeatedly calculate acceleration values, H times. These H values are added at 607, divided by H at 608 to obtain C, the averaged value of acceleration. C is stored in memory at 609.

The program then subtracts C from the wanted acceleration value, N at 610, and stores the difference between N and C as the value D at 611. At 612 the program checks to see if the value D is less than the allotted difference M. If this is true, the program moves back to obtain another averaged value of acceleration, C. If false, it then checks to see if C is less than M at 613. If C is less than M at 613, it increments the motor torque value at 614 and loops back to 606 to obtain a new value of C. If not, the program decrements the torque value at 615, and then loops back to obtain a new value of C at 606.

The set velocity subroutine is virtually identical to the set acceleration subroutine specifically illustrated in FIG. 13 except that only velocity is calculated instead of continuing on to calculate the acceleration value. The subroutines discussed above can be arranged to calibrate or run the system. A calibration routine can be set up as follows:

1. With no load to the motor shaft, set the torque and measure acceleration;
2. Input the mass of a known load to memory;
3. Affix this mass to the driveshaft;
4. Recall the above value of torque which was set and record a new value of acceleration with the known mass;
5. Subtract the known mass acceleration value from the no load acceleration value, and store this value of acceleration difference in the memory;
6. Multiply the second value of acceleration by the calibrated mass. Divide this value by the acceleration difference obtained in step 5 to determine the heretofore unknown mass of the shaft and rotor. Multiply the now known mass by the first value Of acceleration to obtain a calibrated force. Store this value of calibrated force in computer memory;
7. Set the acceleration value to zero for selected velocities. The force value obtained when the acceleration is zero is the value of the bearing resistance, which varies as a function of velocity, with each value of bearing resistance obtained as a function of velocity being stored in a table for force calibrations;
8. With a known mass, record acceleration for each value of binary number output by the computer and thus each value of set current and set force used in the motor. Multiply acceleration by mass to obtain a force value for each binary member and store in a force number table;
9. Using the calculated force number table and the bearing friction velocity table, obtain a corrected force value for each binary number output by the computer;
10. Obtain a value of force and determine unknown masses by dividing force obtained in step 9 by acceleration; and
11. Multiply the known mass by the measured acceleration to determine the total forces acting on the driveshaft.

Once the overall system is calibrated the individual fastener tightening routines, including the establishment of the specific parameters needed in the execution of these routines, are set. The flow charts described below illustrate the threaded fastener tightening subroutines employed in the system and method of the present invention.

THREADED FASTENER TIGHTENING FLOW CHARTS

Run-on Subroutine

Figure 14:
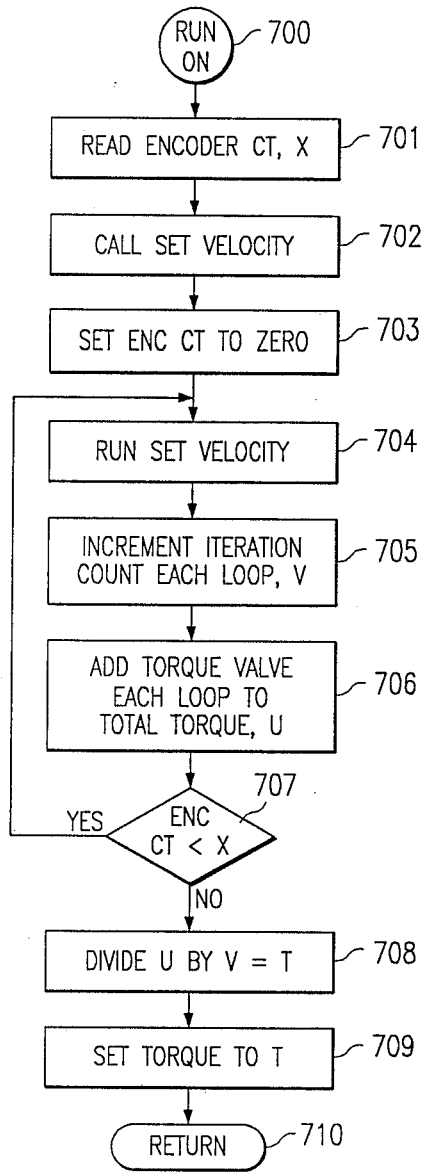
FIG. 14 is a flow chart of the software which illustrates the threaded fastener run-on subroutine used in the system of the present invention.

The fastener run-on subroutine 700 as shown in FIG. 14 starts at 701 to read from memory the number of encoder counts over which torque (X) is averaged. The subroutine then continues on to 702 where it calls the set velocity subroutine which is described above. Once this is accomplished, the subroutine continues on to 703 where the encoder counter value is set to zero. The subroutine then continues on at 704 to run the set velocity subroutine previously described. At the end cf each iteration loop a loop counter (v) is incremented by one at 705 and at 706 the torque value set for each iteration loop is added to the total torque value (U). Next, the encoder counter value is checked to see if this value is less than (X). If the answer is yes, the program loops back to 704 and continues on in the previously described manner. If the answer is no, the program continues on to 708 where the total torque (U) is divided by the number of iteration loops (V) to obtain an average torque value (T). The subroutine then continues on to 709 where the motor torque is set to the number (T-Average Torque). The subroutine then returns to the main program at 710.

End Point Subroutine

Figure 15:
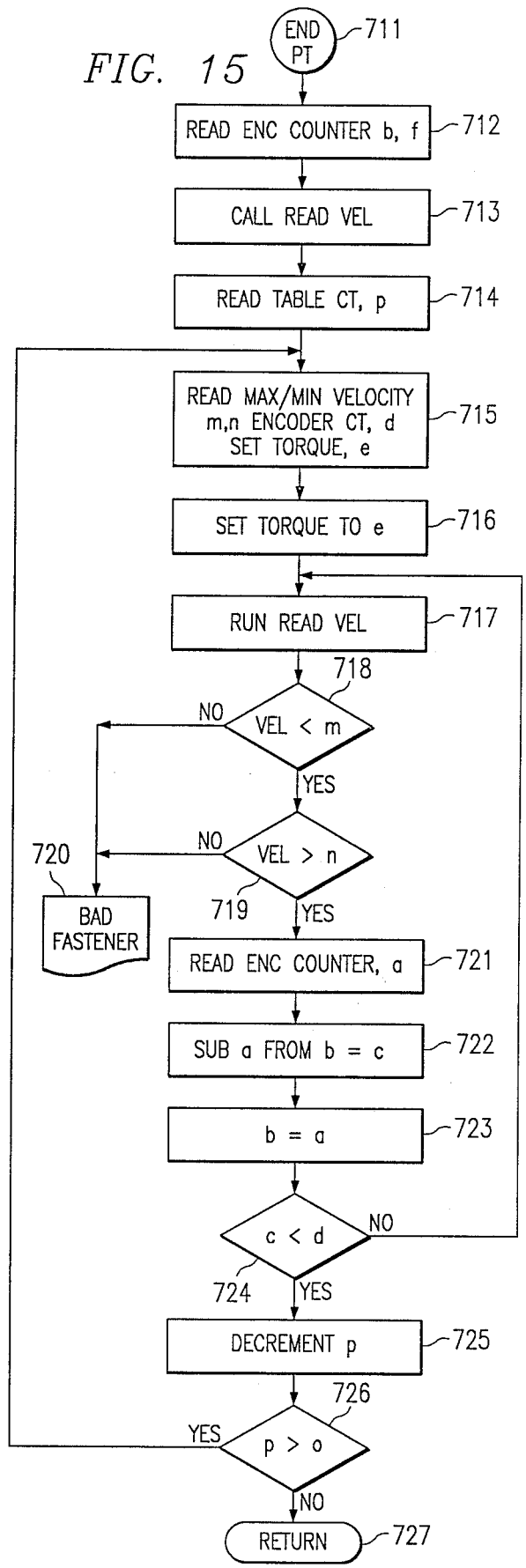
FIG. 15 is a flow chart of the software which illustrates the threaded fastener end-point subroutine used in the system of the present invention.

The threaded fastener tightening end point subroutine 711, as shown in FIG. 15, starts at 712 by reading the encoder counter value and storing it as the value (b). This value is also stored in permanent memory as the value (f).

The subroutine then continues on to 713 to call the previously described read velocity subroutine. Next at 714 the number of table counts over which the subroutine is to be run (p) is read from memory. The program then continues on to 715 to also read from a table containing different values as a function of the table counter value. These values are the maximum and minimum velocity values allowed (m and n), the number of encoder counts over which these velocity values are checked (d), and the value of torque (e) which is set for that number of encoder counts.

The subroutine then continues on to 716 at which the motor torque is set to the value (e). Next, the read velocity subroutine is run at 717 and for each iteration of this subroutine, the value of velocity is checked at 718 to see whether it is less than (m) and at 719 to see whether it is greater than (n). If the answer to either of these queries is no, a bad fastener flag is set at 720. If the answers are yes, the subroutine continues on to 721 to read the present value of the encoder counter (a).

At 722 the value (a) is subtracted from the value (b) and stored as the value (c). At 723 the value (b) is set equal to the value (a). Next at 724 the value (c) is checked to see whether it is less than the value (d). If the answer is no, the program loops back to 717 and continues on. If the answer is yes, the program counter is decremented by one at 725 and checked at 726 to see if this value is greater than zero. If the answer is found to be yes, the program loops back to 715 where new values of (m,n,d,e) are read from the table as a function of the new table count and the program continues to loop until at 726 the answer is no. The subroutine then returns at 727 to the main program.

End Set Subroutine

Figure 16:
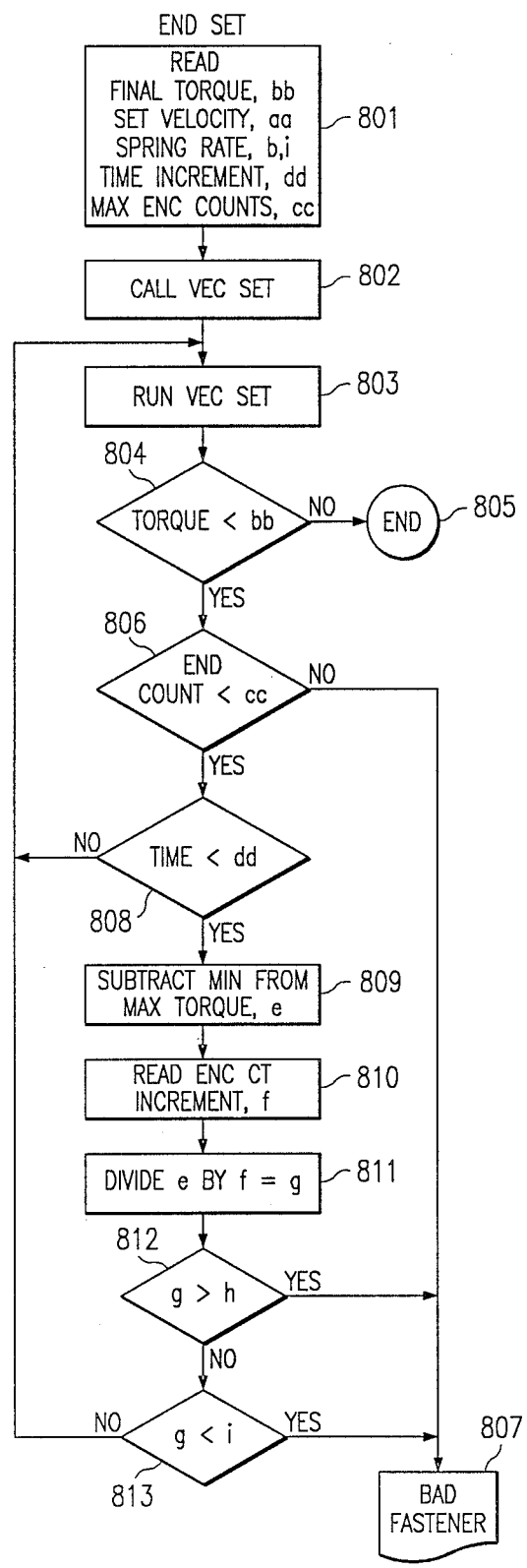
FIG. 16 is a flow chart of the software which illustrates the threaded fastener end-set subroutine used in the system of the present invention.

The threaded fastener tightening subroutine as shown in FIG. 16 starts at 801 and reads from memory the final torque value (bb), the set velocity value (aa), the spring rate (h, i), the time increment (dd), and the maximum encoder counts (cc). The subroutine continues on to 802 where the velocity set subroutine previously described is called from memory. At 803 the velocity set subroutine is run. The subroutine then continues on to 804 where the torque is checked to see whether it is less than (bb). If the answer is no, the program ends at 805. If the answer is yes, the subroutine continues on tO 806 tO check whether the encoder counts are less than (cc). If the answer is no, a bad fastener flag is set at 807. If the answer is yes, the subroutine continues on to 808 to check whether or not the time increments are less than (dd). If the answer is no, the subroutine loops back to 803 and continues to loop until it gets a yes. If the answer is yes, the subroutine continues on to 809 where the minimum torque is subtracted from the maximum torque and stored as the value (e). The subroutine then continues on to read the encoder count (f) at 810 and then at 811 to divide (e) by (f) to get (g). Next, at 812 the subroutine checks to see whether (g) is greater than (h) and at 813 whether (g) is less than (i). If the answer to both inquiries is no, the subroutine loops back to 803 and continues looping until the end criteria is met. If the answer to either inquiry is yes, a bad fastener flag is set at 807.

As can be seen from the above description, it is possible to determine the total forces needed to tighten the fastener. At startup, the constant acceleration can be used in conjunction with a constant velocity to determine the mass of the fastener, and also the friction or, if averaging techniques are used, the average friction of the threads.

Once these parameters are established, and the desired run-on velocity reached, a constant force is set and deviations from this constant velocity used to determine the end of the run-on part of the tightening operation.

Next the program uses a series of stepped constant velocity increments for set rotational distances, and constant deceleration increments also for set rotational distances. The rotational increments are made progressively smaller, and the allowed torque values are made progressively larger as the tightening proceeds. The final deceleration value should bring the velocity to zero, or close to zero.

The forces needed to maintain a constant velocity, or constant acceleration should constantly increase with the largest value of force at a constant velocity being equal to the clamping pressure. Also, during the deceleration phase, since the mass of the fastener has been determined, the clamping force is equal to the applied force minus the inertial forces of the mass and, in this phase, the clamping force may be completely determined by subtracting the inertial forces from the total forces.

It is within the scope of the present invention that other combinations of setting velocity, distance, and acceleration can be used in an order other than that described above to both determine the integrity and clamping pressure of a threaded fastener.

While the preferred embodiment of the present invention utilizes an electric motor, other types of motors, such as hydraulic or pneumatic driven motors can be utilized with proper controls to set the torque, velocity, and acceleration in accordance with the teachings of the present invention.

Figure 17:
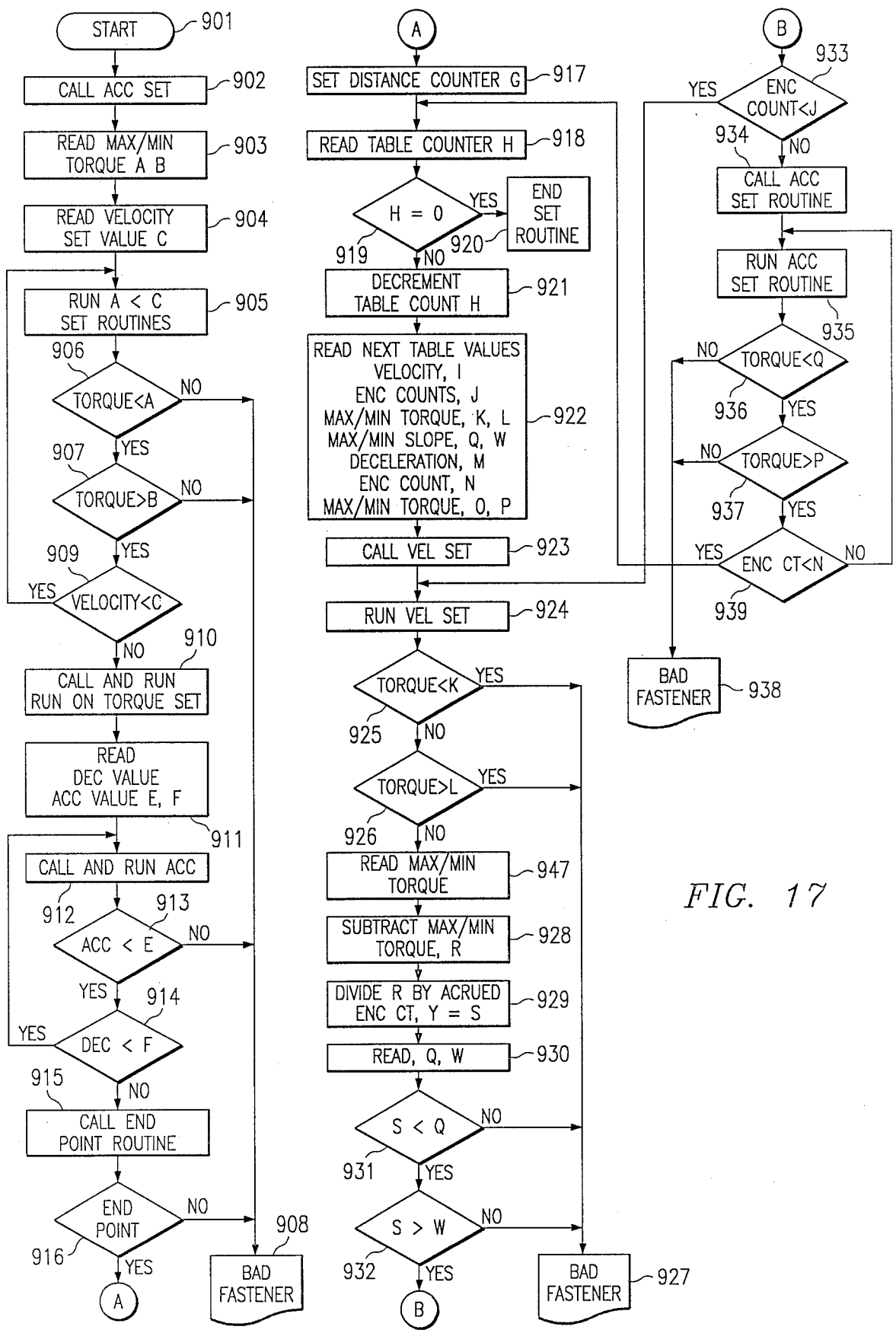
FIG. 17 is a flow chart of the software which illustrates the operation of a system for tightening threaded fastener assemblies constructed in accordance with the trackings of the present invention.

A flow chart which describes an illustrative routine to determine the integrity of threaded fasteners is shown in FIG. 17. Following start at 901, the previously described acceleration set subroutine is called at 902. The program continues on to 903 and reads from memory the maximum (A) and minimum (B) torque values for proper run-on conditions. The program continues on to read at 904 the velocity value (C) which when reached, indicates the acceleration sub routine is to be ended. The program continues on at 905 to run the acceleration set subroutine. At each iteration of this routine, the program continues on to check at 906 whether torque is less than A, and at 907 whether torque is greater than B. If the answer at each of these check points is no, the program indicates a bad fastener at 908. If the answer is yes, the program continues on to 909 to determine if the velocity value is less than C, which is the desired run-on velocity. If the velocity is less than C, the program loops back to 905 and continues on. Once the velocity value equals or exceeds C, the program continues on to 910 which calls a subroutine that determines and sets a value of run-on torque. The program then reads at 911 maximum value of acceleration or deceleration (E,F) for the set value of torque (D). The program then calls and runs the previously described read acceleration subroutine at 912 and continues on to check at 913 whether or not the acceleration value is less than E. If not, the program indicates a bad fastener at 908. If so, the program continues on to check at 914 whether the deceleration value is less than F. If this is so, the program loops back to 912 and continues on. If answer is no, the program calls a subroutine at 915 which determines whether or not the runon-end point has been reached. If run-on-end point has been reached at 916, the program continues on to set the distance counter (G) at 917. If the end point has not been reached, the program indicates a bad fastener at 908. Once (G) is set to some preprogrammed value read from memory, the program continues on to read the program tightening table counter value (H) at 918. At 919 it checks to see whether this value is zero, and if so, exits at 920 to the end set subroutine, described above. If not, the program continues on to decrement the table count value (H) at 921. It then continues on to 922 and reads the wanted velocity (I), the number of encoder counts where that velocity is held constant, (J), and the maximum and minimum torque values (K,L) allowed to maintain that value. It also reads a negative acceleration value (M), the number of encoder counts (N) for which the negative acceleration value is to be maintained, and the maximum and minimum torque (0), (P) allowed to maintain that value of acceleration.

The program continues on at 923 to call the previously described velocity set subroutine and run that routine at 924. The program checks at 925 and 926, respectively, to see whether the torque is below or above the allowed levels. If either is so, the program indicates a bad fastener at 927. If not, the program continues on to read the maximum torque at 928 and at 928 to subtract the minimum from the maximum torque values needed to maintain the set velocity and stores this value in memory as the letter (R) Next, at 929, the accrued value of encoder counts is read and stored as the value (Y). This value is stored in memory as the letter value (S), which is the spring constant. Next, at 930 the spring constant limits are read and at 931 and 932, respectively, the spring constant (S) is checked to see if it is above or below maximum and minimum limits (Q) and (W). If the answer is no, the system indicates a bad fastener at 927. If the answer is yes, the system checks at 933 to see whether the maximum encoder values are less than (J). If the answer is yes, the program loops back to 924 and continues on. If the answer is no, the program continues on to 934 where the acceleration set subroutine is called. The program then continues on to 935 where the acceleration set subroutine is run. Next, the torque is checked at 936 and 937, respectively, to see whether it is above or below the maximum torque values (0) (P). If the answer is no, a bad fastener is indicated at 938. If the answer is yes, the program continues on to 939 to check whether the encoder count value is less than (N). If the answer is yes, the program loops back to 918 and if the answer is no, the program loops back to 935.

SUMMARY OF THE INVENTION

As can be seen from the above description, the system of the present invention includes a technique whereby a threaded fastener assembly tightening operation is divided into five discrete phases: a starting phase, a run-on phase, a run-on-end phase, a tightening phase, and an end phase. During the starting phase, the mass of the fastener nut and the fastener nut holding rotating assembly, as well as the rotational resistance caused by the friction of the threads during runon are separately measured. These parameters are stored in a micro processor and used to determine the actual effective torque applied to the fastener. The system also checks the effective torque against pre-stored torque limits (both minimum and maximum) which are then used to determine if the fastener is cross threaded, has damaged threads, improper bolt size, improper thread pitch, or other anomalies indicated by the thread frictional resistance.

Once the startup phase is ended, the system enters a run-on phase wherein the system sets a constant torque on the fastener, as determined by the previously measured parameters, and monitors the fastener acceleration both to determine if an out-of-tolerance condition (i.e. deformed or damaged threads) or the end of the run-on phase has occurred. If a change in velocity indicates the run-on phase may have ended, a special subroutine is then called to determine whether or not the run-on stage has been completed, and at what point the tightening stage is to start. These data are used to zero a distance counter from which the precise amount of fastener angular distance turned can be determined at each point in the tightening phase. As in the startup phase, the system also checks to see that the fastener resistance torque is within the pre-stored limits which indicate the end of the run-on phase. If an out-of-tolerance condition occurs, the fastener is flagged as defective and does not continue on into the fourth phase, for tightening( the fastener.

During the tightening phase a series of rotational distance increments are recalled from memory. For each of these increments, which can vary in size as a function of the fastener angular distance remaining to be tightened, a constant velocity step is maintained, followed by a rapid deceleration to a lower constant velocity step. During each step of constant velocity motion, and during each step of deceleration, a maximum and minimum effective torque value is first calculated from the fastener's measured performance, and then checked against a pre-stored envelope of torque value limits, to determine that proper fastener integrity has been maintained. The fastener torque-deflection ratio (spring rate) is also calculated and checked against limits. If an out-of-tolerance condition occurs, the system is flagged as defective. The maximum and minimum torque comparison values are progressively increased for each distance as the fastener is tightened. The deceleration step values are set such that the velocity at the end of the preset total distance turned is a low value.

The final tightening of the fastener occurs during the end phase, wherein the final torque imparted to the fastener in the tightening phase is increased to a pre-set final specified value. This is accomplished bY setting a low but constant rotational velocity to the fastener while monitoring the torque required to maintain this velocity. When the applied torque becomes equal to the pre-set specified value, the tightening operation is complete. During each of many time intervals during this end phase tightening process, the fastener mechanical spring constant is calculated and compared with the pre-stored envelope of fastener spring constant limits, to assure that the fastener mechanical integrity, as installed, has not been degraded. In addition to the fastener spring constant integrity test, the total rotational distance travelled by the fastener is also measured and, if in excess of a pre-set limit, will flag the assembly as defective.

- As also observed in detail above, the system of the present invention includes a method for controlling the torque applied to a threaded fastener wherein the torque is not measured, but is precisely set by a programmable regulated current source and only the displacement of the shaft rotating the fastener is measured as a function of time. Once the system is calibrated and the operational parameters established, the acceleration and deceleration which occurs as a result of the differences in the forces driving or opposing the motor rOtating the fastener are calculated and stored in a microprocessor. This acceleration and deceleration is used to determine the unknown forces opposing the rotation of the shaft tightening the fastener. Angular rotation per unit of time is used to calculate the values of velocity and acceleration and, thus, the control parameters needed to set the current values to the motor necessary to accomplish the fastener tightening operations.

The setting of the current to the motor driving the shaft rotating the fastener by a programmable regulated current source totally eliminates the need for measuring a low level analog force by means of a torque transducer In addition it provides an accurate means for determining the forces opposing the turning of the fastener at all times prior to completion of the operation.

Since the torque rotating the fastener is set and not measured, the inherent delay between measuring the torque, deciding if it is correct, and shutting down the system in the case of an anomaly is virtually eliminated. This allows enormously faster response time to an anomaly in the fastener tightening operation than in prior art systems. A process control computer is used to accomplish setting of the torque and the measuring of velocity and acceleration of the shaft rotating the fastener. This microprocessor monitors and stores displacement pulses from an incremental shaft encoder and by comparison of changes in displacement to clock pulses, the system establishes a velocity for the rotation of the fastener. Velocity is periodically calculated and stored in a register and each subsequent velocity determination is subtracted from an initial value to determine acceleration, as velocity changes as a function of time.

As it can be seen, the various embodiments of the present invention overcome any of the shortcomings of the prior art threaded fastener assembly tightening systems. It is thus believed that the construction and operation of the present invention will be apparent from the foregoing description. While the system shown described has been characterized as being preferred and in multiple embodiments, it will be obvious that various changes and modifications may be made therein without departing from the spirit and scope of the invention as defined in the following claims.

What is claimed is:

1. A system for the tightening of threaded fastener assemblies comprising:
   a driveshaft having an adapter on one end for receiving a tool for receiving and rotating a threaded fastener;
   a direct current electric motor having a shaft connected to said driveshaft, said motor being operable in the current mode to control the force applied to the shaft thereof by varying the current through the windings;
   means mounted to said motor shaft for rotation therewith and for providing an output signal indicative of the rotary position of said shaft with respect to a reference position, said means for providing an output signal including:
      optical encoder means operably connected to said shaft of said electric motor for rotation therewith;
      means responsive to movement of said encoder means for producing a train of output pulse patterns; and
      counter means connected to said output pulse pattern producing means for maintaining a value indicative of the displacement of said shaft;
   a clock for providing timing pulses;
   current regulator means connected to windings of said motor; and
   processor means responsive to said output signals and to said timing pulses for controlling the output of said regulator and varying the current through the windings of said motor to provide a preprogrammed value of force exerted by the shaft of said motor and, thereby, the force exerted by said drive shaft in rotating a fastener to tighten it upon a threaded receiving means, said processor means includes a microprocessor responsive to both a predetermined value in said counter means and to the force exerted upon said driveshaft by said motor shaft exceeding a preselected value for interrupting the current from said current regulator means to the windings of the motor.

2. A system for the tightening of threaded fastener assemblies as set forth in claim 1 in which said microprocessor includes:
   means responsive to the said value in said counter means being less than said predetermined value and to the force exerted on the driveshaft being greater than the preselected value for reversing the direction of rotation of the motor.

3. An improved system for the tightening of threaded fastener assemblies wherein said forward converter of the type which includes a driveshaft adapted for engagement with a fastener to effect rotation thereof and in which the driveshaft is operably connected to the shaft of a DC motor in which the torque thereof is controlled by the current through the windings, wherein the improvement comprises:
   a current mode power supply connected to the windings of said DC motor, said power supply having means for controlling the positive and negative current produced thereby to change the direction and value of the current flow through the motor windings and vary the torque thereof and thereby change the force applied by the driveshaft to the threaded fastener being tightened onto the assembly, wherein said current mode power supply is a transformer isolated current mode power supply and said transformer isolated current mode power supply includes a forward convertor and in which said forward convertor includes:
      means for varying the current flow produced thereby; and
      a drive circuit for rapidly switching said current flow varying means on and off in response to current flow through the windings of said motor.

4. An improved system for the tightening of threaded fastener assemblies of the type which includes a driveshaft adapted for engagement with a fastener to effect rotation thereof and in which the driveshaft is operably connected to the shaft of a DC motor in which the torque thereof is controlled by the current through the windings, wherein the improvement comprises:
   a current mode power supply connected to the windings of the DC motor, said power supply having means for controlling the positive and negative current produced thereby to change the direction and value of the current flow through the DC motor windings and vary the torque thereof and thereby change the force applied by the driveshaft to the threaded fastener being tightened onto the assembly;
   means for monitoring the position of the DC motor shaft and producing an output signal indicative thereof; and
   processor means for providing programmed control of current through windings of the DC motor in response to the position of the force exerting member being moved by the motor.

5. The improvement as set forth in claim 4, wherein said current mode power supply includes:
  a current sense transformer having a secondary winding connected in series with a diode and a variable burden resistance; and
  a power transformer having a primary connected to a source of DC voltage and in series with a power switch and the primary winding of said current sense transformer;
  means for interrupting the current through said power switch; and
  means for varying the value of said burden resistance to change the rate at which the current through the power switch is interrupted and control the peak output current through the primary winding of said power transformer.

6. The improvement as set forth in claim 5, wherein said burden resistance varying means comprises:
  a parallel resistance network including a plurality of series connected resistors and field-effect transistors; and
  wherein the resistance value of said network is varied by selectively turning ones of the field-effect transistors on or off.

7. The improvement as set forth in claim 6, wherein the resistance value of each of said series connected resistors is different from the others.

8. A method for determining the value of an unknown torque opposing the rotation of a tool driveshaft for tightening of a threaded fastener assembly which driveshaft is connected to the shaft of an electric motor of the type in which the force applied to the shaft is a linear function of the current through the motor, comprising:
  supplying current to the motor with a current mode controlled regulator having a plurality of discrete selectable current values;
  producing signals indicative of the direction and extent of the movement of the driveshaft of the tool;
  providing regular periodic timing pulses;
  providing a program controlled processor for receiving said driveshaft movement signals and said timing pulses;
  periodically calculating from said driveshaft movement signals and said time pulses the acceleration of the driveshaft;
  calibrating the motor of the tool by calculating driveshaft acceleration values with no load and a resistance torque of known value for a plurality of discrete current values being supplied to the motor to determine the torque applied to a threaded fastener by the driveshaft of the motor for each of said discrete selectable current values from the regulator;
  performing said calculations using said processor;
  varying the current supplied by the regulator to the motor with the resistance torque of unknown value connected to the driveshaft thereof until the acceleration of the driveshaft is about zero and determining the value of the unknown torque form the current value at that point; and
  controlling said current regulator using said processor to vary the current delivered to the motor in accordance with said calculations.

9. A method for determining the value of an unknown torque opposing the rotation of a tool driveshaft as set forth in claim 8 wherein said current varying step includes:
  repeatedly setting a current value to be supplied to the motor by the regulator and calculating the acceleration of the driveshaft; and
  setting successive current values which tend to cause the calculated driveshaft acceleration values to change in a direction toward zero.

10. A system for controlling the velocity and torque of a tool driveshaft comprising:
  an electric motor having a shaft connected to the driveshaft of said tool;
  encoder means for producing signals indicative of the direction and incremental value of movements in the driveshaft of said tool;
  means for producing discrete selectable values of current connected to said motor to produce a torque on the driveshaft of said tool proportional to the current value supplied; and
  digital program controlled processor means connected to said encoder means for receiving signals therefrom and calculating values of driveshaft velocity and acceleration from incremental movement as a function of time and connected to said current producing means to select and set values of current based upon said calculated driveshaft velocity and acceleration values to control the driveshaft velocity and the torque applied to the fastener by the driveshaft, wherein said encoder means includes counter means for accumulating signals to provide an indication to said processor means of the total number of revolutions which a fastener has been rotated by the driveshaft.

11. A system for controlling the velocity and torque of a tool driveshaft as set forth in claim 10 which also includes:
  a host computer connected to said processor means for providing additional storage and control therefor.

12. A system for controlling the velocity and torque of a tool driveshaft as set forth in claim 10 wherein said encoder means includes:
  means for producing a series of pulses the number of which indicates the incremental value of angular displacement of the driveshaft, and means for producing a single pulse the presence of which indicates rotation of the driveshaft in a selected direction.

13. A system for controlling the velocity and torque of a tool driveshaft as set forth in claim 10 wherein said current producing means includes:
  a current source;
  means for switching the polarity of an input current connected to supply current to said electric motor;
  a pass element connected between said current source and said switching means for regulating the current supplied to the motor;
  means connected to said pass element for controlling the value of current supplied from the source to the switching means;
  means for connecting said processor means to said control means and to said switching means to enable signals from said processor means to select the value and polarity of current supplied from said source to said motor.

14. A system for controlling the velocity and torque of a tool driveshaft as set forth in claim 13 wherein said control means for said pass element includes:
  a current mode control circuit;

means responsive to the voltage value being supplied to said motor for providing a voltage feedback signal to said control circuit; and means responsive to the current value being supplied to said actuator for providing a current feedback signal to said control circuit.

15. A system for controlling the velocity and torque of a tool driveshaft as set forth in claim 13 which also includes:

means responsive to the operating conditions of said motor and to said processor means for varying the compensation to optimize the performance of the actuator.

16. A method for tightening a threaded fastener device, comprising:

rotating a threaded fastener device;

determining at least a first parameter associated with the fastener device during its rotation;

monitoring at least a second parameter relating to the rotation of the fastener device;

checking a third parameter relating to rotation of the fastener device to determine if the fastener device has rotated to a predetermined condition;

evaluating a fourth parameter while a fifth parameter relating to rotation of the fastener device is changed; and observing a sixth parameter to determine whether the tightening of the fastener device is complete.

17. A method, as claimed in claim 16, further comprising:

calibrating a system for tightening the fastener device by obtaining a plurality of values associated with the system for determining the mass of the fastener device to be rotated.

18. A method, as claimed in claim 17, wherein:

said plurality of values includes a value relating to at least one of force, mass and acceleration.

19. A method, as claimed in claim 16, wherein:

at least one of said first through sixth parameters is the same parameter as another one of said first through sixth parameters.

20. A method, as claimed in claim 16, wherein:

at least one of said first, fourth and sixth parameters relates to torque of the fastener device.

21. A method, as claimed in claim 16, wherein:

at least one of said second and fifth parameters relates to one of velocity and acceleration of the fastener device.

22. A method, as claimed in claim 16, wherein:

said third parameter relates to one of velocity and distance of the fastener device.

23. A method, as claimed in claim 16, wherein:

during said step of rotating, a mass of a fastener device and a resistance force associated therewith is determined.

24. A method, as claimed in claim 23, wherein:

during said step of rotating, at least one of the mass of the fastener device and its resistance force is checked to determine if said one is within an expected range.

25. A method, as claimed in claim 16, wherein:

said first parameter includes a torque acting on the fastener device and, during said step of monitoring, the velocity of the fastener device is maintained substantially constant for at least a predetermined one of time and distance.

26. A method, as claimed in claim 25, wherein:

during said step of monitoring, the value of the torque acting on the fastener device is compared with at least one predetermined value to determine whether the fastener device is defective.

27. A method, as claimed in claim 25, wherein:

said step of evaluating includes evaluating the torque over one of a predetermined distance and a predetermined time in connection with analyzing the spring rate of the fastener device.

28. A method, as claimed in claim 16, wherein:

said third parameter relates to velocity and a determined torque is maintained during the checking of said third parameter to determine whether the fastener device has reached a predetermined position in the tightening thereof.

29. A method, as claimed in claim 28, wherein:

during said step of checking, a magnitude relating to one of change in velocity and distance travelled associated with the fastener device is monitored to determined whether the fastener device is defective.

30. A method, as claimed in claim 16, wherein:

said fourth parameter relates to torque and comparing the value of the torque with predetermined torque values during said step of evaluating.

31. A method, as claimed in claim 30, wherein:

said step of evaluating includes rotating the fastener device at a plurality of different velocities, with each one of said plurality of different velocities being associated with the rotating fastener device for one of a predetermined distance and a predetermined time.

32. A method, as claimed in claim 16, wherein:

said sixth parameter relates to torque and said step of observing includes determining when the torque acting on the fastener device is a predetermined value.

33. A method, as claimed in claim 32, wherein:

said step of observing also includes monitoring one of distance and time relating to rotation of the fastener device and identifying the fastener device as being defective when the predetermined value of torque does not occur before one of a predetermined distance and time.

34. A method, as claimed in claim 32, wherein:

said step of observing includes checking a spring rate relating to the fastener device to determine whether it is decreasing to determine whether the fastener device is defective.

35. A method for tightening a threaded fastener device, comprising:

rotating a threaded fastener device;

monitoring at least one of the following parameters relating to the fastener device: torque, velocity, acceleration, deceleration, distance and spring rate; and determining whether the fastener device is defective using information obtained during said monitoring step.

36. A method, as claimed in claim 35, wherein:

said step of determining includes comparing the value of torque acting on the fastener device with at least one predetermined value to determine whether the fastener device is defective.

37. A method, as claimed in claim 35, wherein:

said step of determining includes determining a magnitude relating to one of change in velocity and distance travelled associated with the fastener device to determine whether the fastener device is defective.

38. A method, as claimed in claim 35, wherein:
said step of determining includes determining when torque acting on the fastener device is a predetermined value and identifying the fastener device as being defective when the predetermined value of torque does not occur before one of a predetermined distance and time.

39. A method, as claimed in claim 35, wherein:
said step of determining includes determining whether spring rate relating to the fastener device is decreasing to determine whether the fastener device is defective.

* * * * *